US010970888B2

(12) United States Patent
Suzuki et al.

(10) Patent No.: US 10,970,888 B2
(45) Date of Patent: Apr. 6, 2021

(54) INFORMATION PROCESSING DEVICE, INFORMATION PROCESSING METHOD AND PROGRAM

(71) Applicants: Sony Corporation, Tokyo (JP); Sony Computer Entertainment Inc., Tokyo (JP)

(72) Inventors: Satoshi Suzuki, Tokyo (JP); Shinichirou Tobinaga, Tokyo (JP); Noriyuki Hoshihara, Tokyo (JP)

(73) Assignees: Sony Corporation; Sony Interactive Entertainment Inc.

( * ) Notice: Subject to any disclaimer, the term of this patent is extended or adjusted under 35 U.S.C. 154(b) by 0 days.

(21) Appl. No.: 14/366,495

(22) PCT Filed: Dec. 18, 2012

(86) PCT No.: PCT/JP2012/082813
§ 371 (c)(1),
(2) Date: Jun. 18, 2014

(87) PCT Pub. No.: WO2013/099704
PCT Pub. Date: Jul. 4, 2013

(65) Prior Publication Data
US 2014/0327616 A1 Nov. 6, 2014

(30) Foreign Application Priority Data
Dec. 27, 2011 (JP) .............................. JP2011-284750

(51) Int. Cl.
*G06T 11/20* (2006.01)
*G06T 11/00* (2006.01)
(Continued)

(52) U.S. Cl.
CPC .............. *G06T 11/20* (2013.01); *G06F 3/033* (2013.01); *G06T 11/00* (2013.01); *G09B 29/006* (2013.01); *G09B 29/10* (2013.01); *G06F 16/587* (2019.01)

(58) Field of Classification Search
CPC .............. G06F 3/033; G06F 17/30265; G06F 17/30041; G06F 17/30061; G06T 11/00; G06T 11/20; G09B 29/006; G09B 29/10
(Continued)

(56) References Cited

U.S. PATENT DOCUMENTS 6,292,215 B1 * 9/2001 Vincent .................. H04N 5/765
348/169
7,046,285 B2 5/2006 Miyagi et al.
(Continued)

FOREIGN PATENT DOCUMENTS

CN 101930780 A 12/2010
CN 102111526 A 6/2011
(Continued)

OTHER PUBLICATIONS

International Search Report from International Publication PCT/JP2012/082813 dated Apr. 16, 2013.
(Continued)

*Primary Examiner* — Patrick N Edouard
*Assistant Examiner* — Douglas M Wilson
(74) *Attorney, Agent, or Firm* — Lerner, David, Littenberg, Krumholz & Mentlik, LLP

(57) ABSTRACT

According to an embodiment of the present technology, there is provided an information processing device including an acquisition unit configured to acquire multiple images to which position information showing an imaging position is attached, and a display control unit configured to display a first map on which a pointer indicating the imaging position
(Continued)

shown by the position information is displayed while switching a reduced scale and a display area according to an operation of a user, and configured to display a second map of a fixed reduced scale together with the first map while causing a display area to cooperate with a display area of the first map.

5 Claims, 20 Drawing Sheets

(51) Int. Cl.
   *G09B 29/10* (2006.01)
   *G09B 29/00* (2006.01)
   *G06F 3/033* (2013.01)
   *G06F 16/587* (2019.01)

(58) Field of Classification Search
   USPC ......... 345/157; 382/173, 286; 715/205, 206, 715/208, 243, 248, 253
   See application file for complete search history.

(56) References Cited

U.S. PATENT DOCUMENTS

| | | | |
|---|---|---|---|
| 7,475,060 B2 | 1/2009 | Toyama et al. | |
| 7,818,116 B1 | 10/2010 | Nesbitt | |
| 9,025,810 B1* | 5/2015 | Reinhardt | G06T 17/05 382/100 |
| 2004/0225635 A1* | 11/2004 | Toyama | G06F 16/444 |
| 2006/0139375 A1* | 6/2006 | Rasmussen | G06F 16/29 345/641 |
| 2007/0244634 A1* | 10/2007 | Koch | G01C 21/00 |
| 2008/0232695 A1* | 9/2008 | Noda | G06F 16/58 382/224 |
| 2009/0184982 A1 | 7/2009 | Takakura et al. | |
| 2010/0171763 A1* | 7/2010 | Bhatt | G06F 16/9537 345/660 |
| 2010/0259641 A1 | 10/2010 | Fujimoto | |
| 2011/0187741 A1* | 8/2011 | Akiya | G09B 29/10 345/625 |
| 2015/0142806 A1* | 5/2015 | Koch | G01C 21/00 707/737 |
| 2017/0205997 A9* | 7/2017 | Gold | G06F 3/04817 |
| 2018/0082402 A1* | 3/2018 | Gold | G01C 21/3673 |
| 2019/0080436 A1* | 3/2019 | Gold | G01C 21/26 |

FOREIGN PATENT DOCUMENTS

| | | |
|---|---|---|
| EP | 1133150 A2 | 9/2001 |
| EP | 2088778 A1 | 8/2009 |
| EP | 2267716 A2 | 12/2010 |
| JP | 2001-189905 A | 7/2001 |
| JP | 2007127867 A | 5/2007 |
| JP | 2008283347 A | 11/2008 |
| JP | 2009300328 A | 12/2009 |
| JP | 2010-039583 A | 2/2010 |
| JP | 2010151742 A | 7/2010 |
| JP | 2010243907 A | 10/2010 |
| JP | 2011145407 A | 7/2011 |
| JP | 2011154678 A | 8/2011 |
| WO | 2010078573 A2 | 7/2010 |

OTHER PUBLICATIONS

Office Action issued in corresponding CN application 201280070241.2 dated Jan. 13, 2016.
Article 94(3) issued in corresponding EP application 12863728.7 dated Mar. 16, 2016.
Japanese Office Action for Application No. 2013551633 dated Oct. 25, 2016.
Chinese Office Action for Application No. 201280070241.2 dated Sep. 5, 2016.
Chinese Office Action for Application No. 201280070241.2 dated Mar. 7, 2017.
Extended European Search Report for Application No. EP17188988.4 dated Jan. 3, 2018.

* cited by examiner

FIG. 14
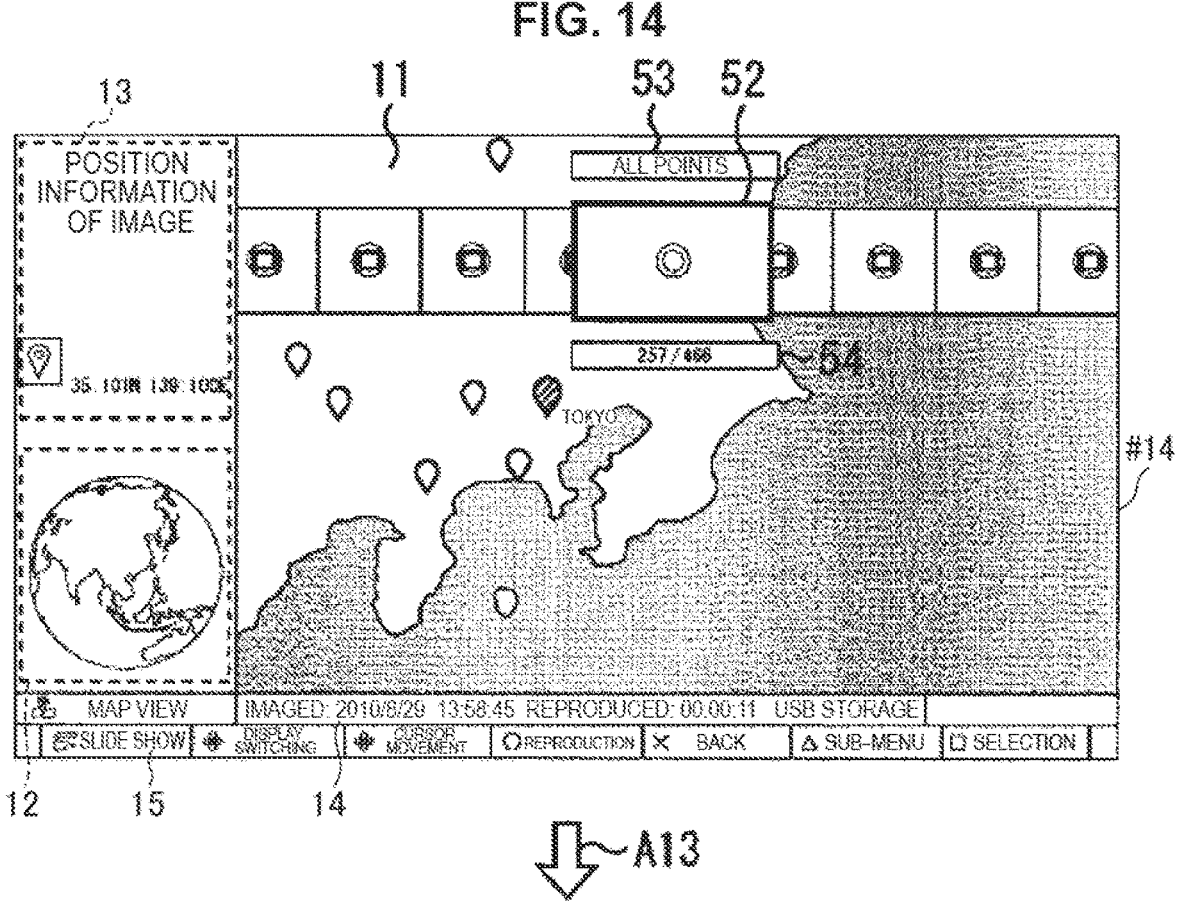
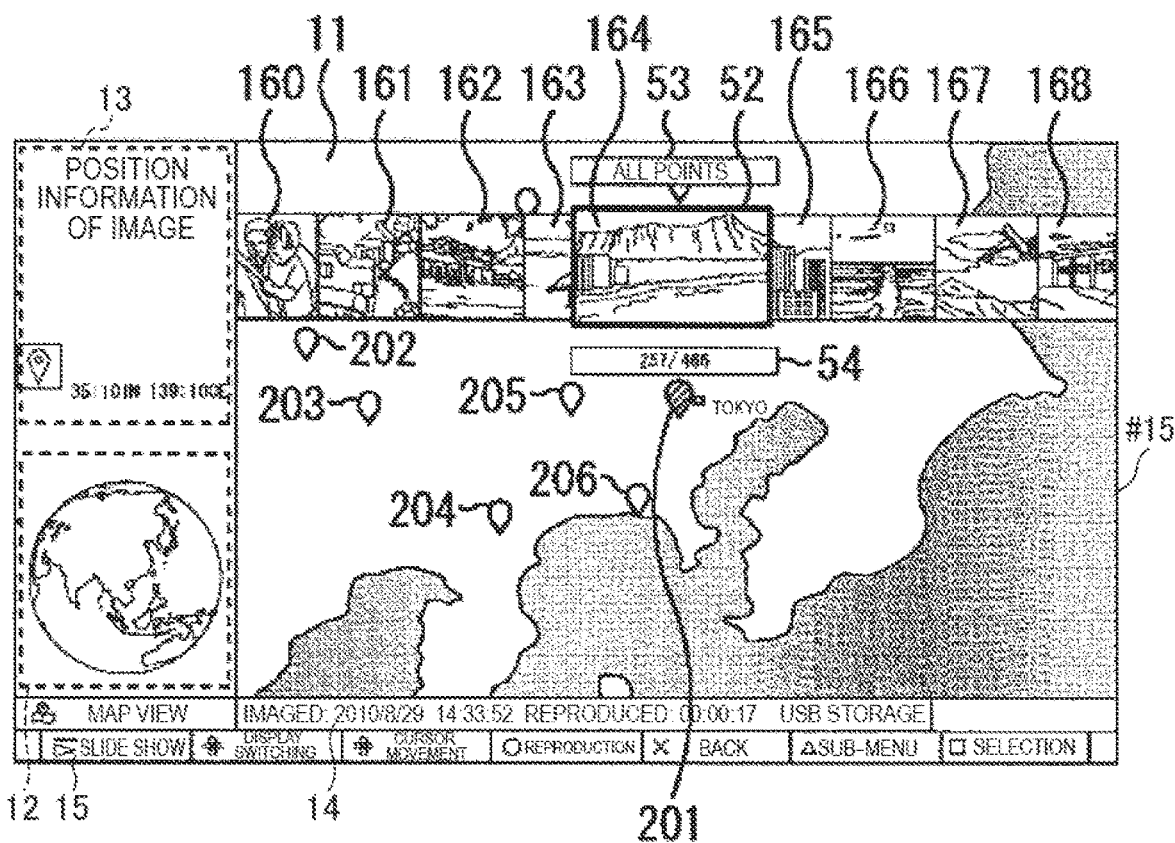

FIG. 20
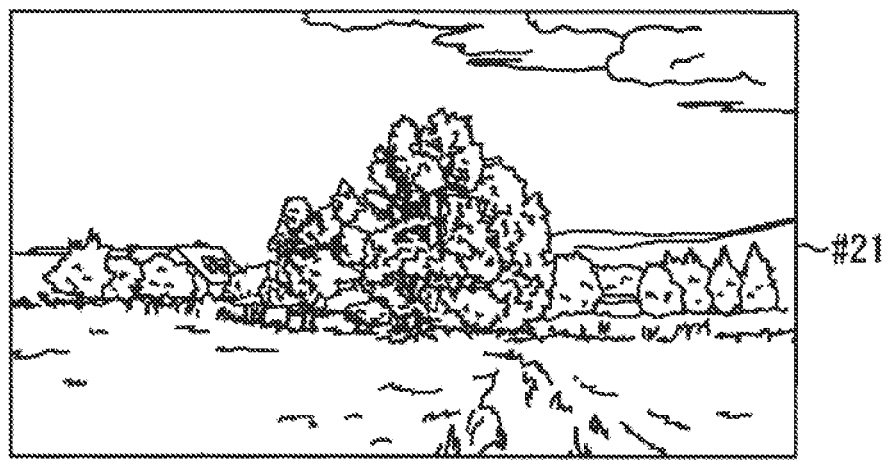
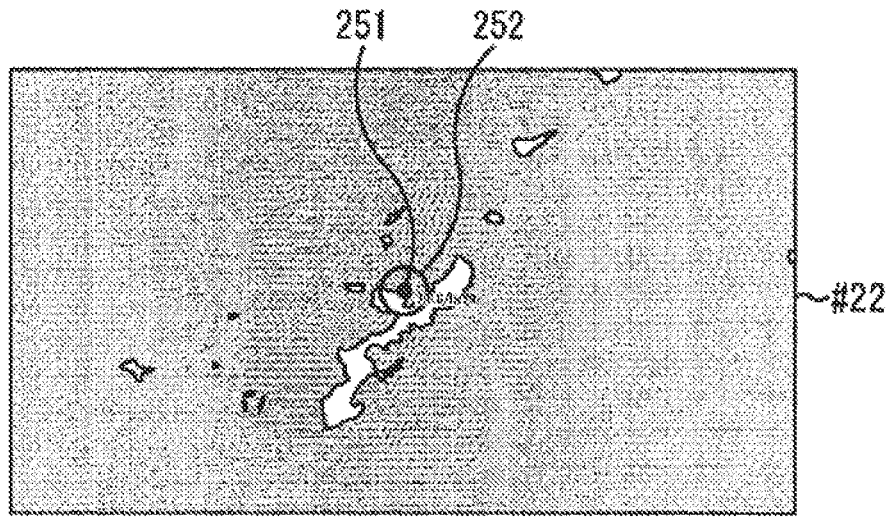
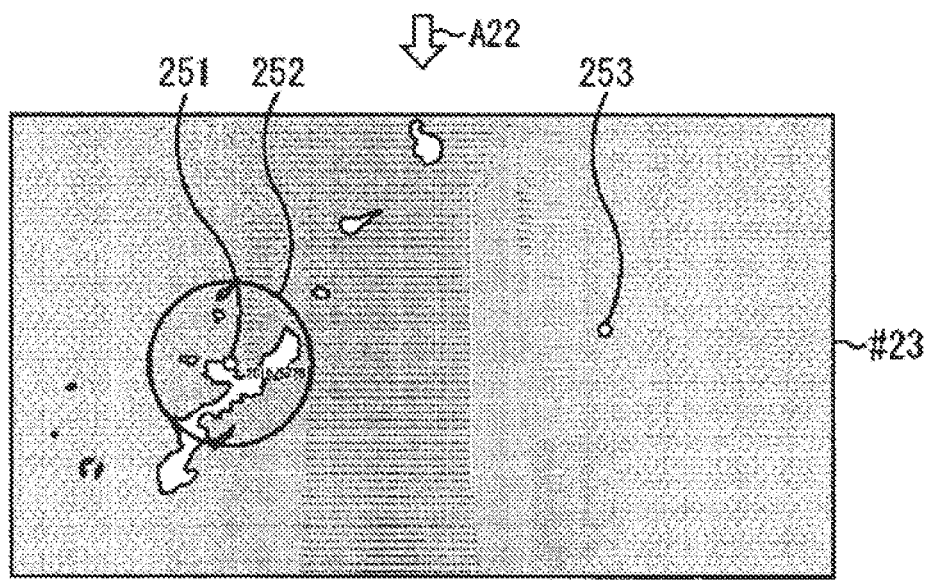

FIG. 22
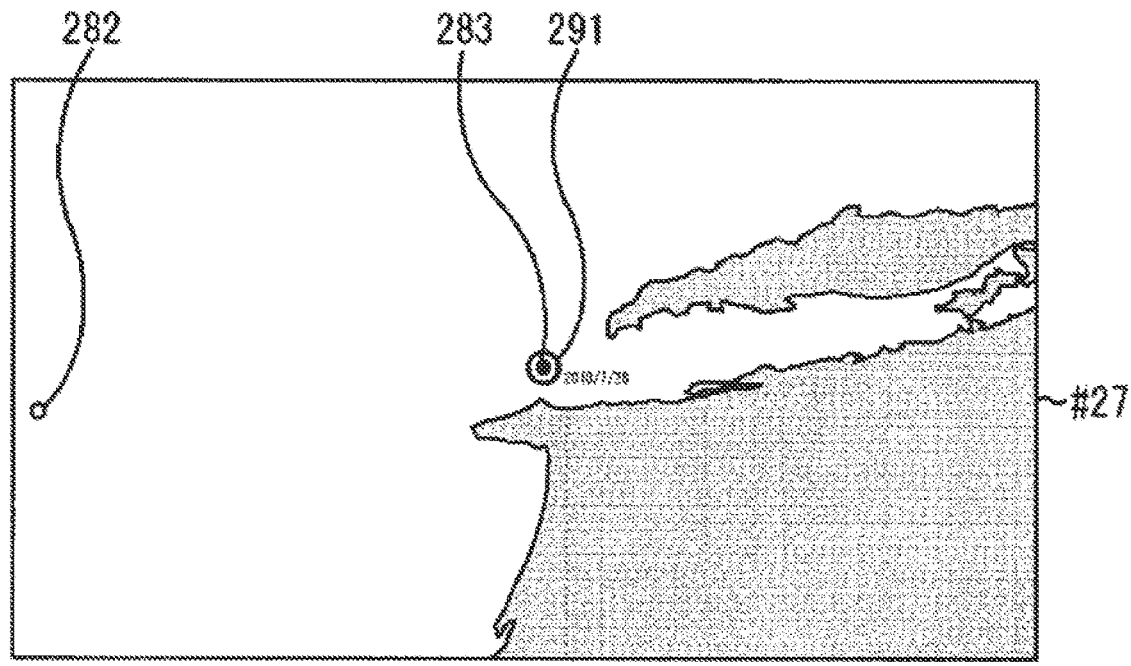
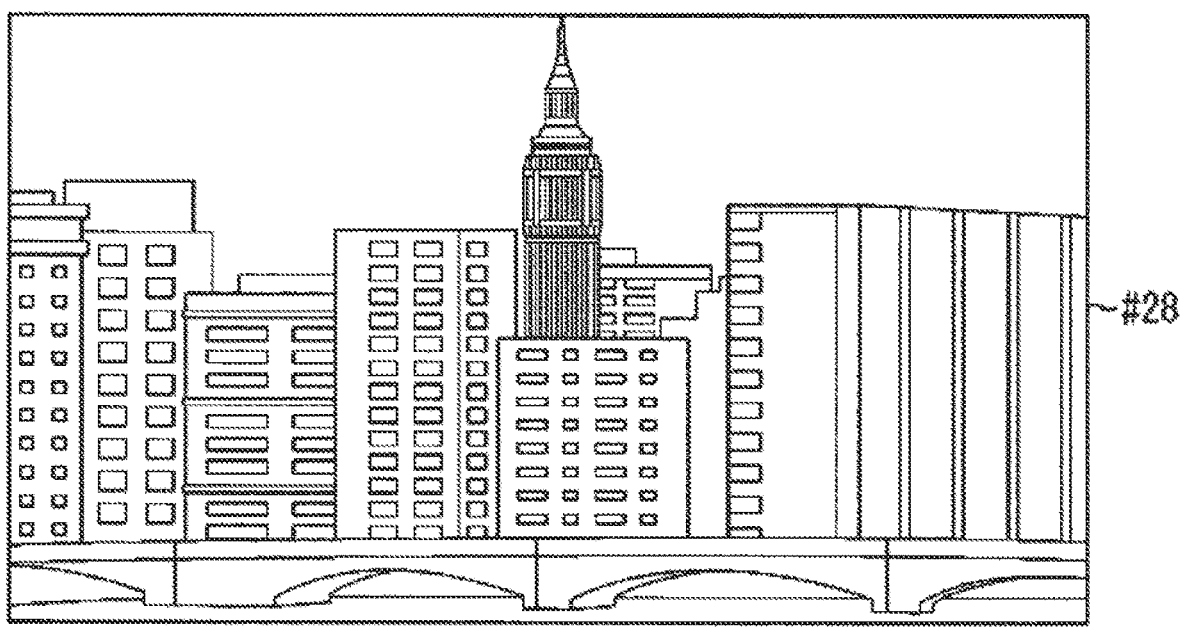

INFORMATION PROCESSING DEVICE, INFORMATION PROCESSING METHOD AND PROGRAM

CROSS-REFERENCE TO RELATED APPLICATION

The present application is a national phase entry under 35 U.S.C. § 371 of International Application No. PCT/JP2012/082813 filed Dec. 18, 2012, published on Jul. 4, 2013 as WO 2013/099704 A1, which claims priority from Japanese Patent Application No. JP 2011-284750, filed in the Japanese Patent Office on Dec. 27, 2011.

TECHNICAL FIELD

The present technology relates to an information processing device, an information processing method and a program. Especially, the present technology relates to an information processing device, information processing method and program that can intuitively check the imaging position of an image from a map.

BACKGROUND ART

Recently, a portable terminal such as a digital camera mounting a GPS (Global Positioning System) sensor has become widespread. In a case where imaging is performed by a portable terminal having such a positioning function, information showing latitude and longitude in addition to information on the imaging date and time is attached to a file of image data as metadata.

Moreover, among applications that manage images, there is the one that displays a map in which a pointer is arranged in the imaging position of each image when an image file to which information on the imaging position is attached is imported. By this means, the user can view the image while confirming where the image is taken.

CITATION LIST

Patent Literature

Patent Literature 1: JP 2010-39583A

SUMMARY OF INVENTION

Technical Problem

Especially, in a case where the reduced scale is large (the display area is narrow), when the display area on the map is switched, the relationship between the imaging positions of images may become difficult to be understood. For example, in a case where there are images taken in various locations in the world, the whole cannot be confirmed when the reduced scale is large, and it is not intuitively understood around which area an area including a certain pointer is in the entire world map.

This present technology is made considering such a situation, and can intuitively check the imaging positions of images from a map.

Solution to Problem

According to an embodiment of the present technology, there is provided an information processing device including an acquisition unit configured to acquire multiple images to which position information showing an imaging position is attached, and a display control unit configured to display a first map on which a pointer indicating the imaging position shown by the position information is displayed while switching a reduced scale and a display area according to an operation of a user, and configured to display a second map of a fixed reduced scale together with the first map while causing a display area to cooperate with a display area of the first map.

According to an embodiment of the present technology, the display control unit may switch the display area of the first map so as to include the position indicated by the pointer selected by the user, and displays a representative image of the images taken in the position indicated by the selected pointer together with the first map and the second map.

According to an embodiment of the present technology, the display control unit may display a time series of the images taken in the position indicated by the selected pointer.

The display control unit may display the images forming the time series one by one.

The display control unit may display the time series of the images taken in positions of all pointers.

The display control unit may switch the display area of the first map so as to include an imaging position of one image selected from the time series.

When the imaging position of the newly selected image and the imaging position of the previously selected image are different, the display control unit may scroll the display area of the first map from an area including the imaging position of the previously selected image to an area including the imaging position of the newly selected image.

When scrolling the display area of the first map, the display control unit may display the first map of each area while changing the reduced scale according to a distance between the imaging position of the newly selected image and the imaging position of the previously selected image.

The display control unit may display the first map of each area while decreasing a minimum reduced scale as the distance between the imaging position of the newly selected image and the imaging position of the previously selected image is longer.

The display control unit erases the display of the first map and the second map, and displays the images forming the time series one by one.

When the imaging position of the newly displayed image and the imaging position of the previously displayed image are different, the display control unit may display an animation formed with a map of each area on a line connecting the imaging position of the previously displayed image and the imaging position of the newly displayed image, before displaying the newly displayed image.

The display control unit may display the map of each area forming the animation while changing the reduced scale according to the distance between the imaging position of the newly displayed image and the imaging position of the previously displayed image.

The display control unit may display the map of each area while decreasing a minimum reduced scale as the distance between the imaging position of the newly displayed image and the imaging position of the previously displayed image is longer.

The display control unit may display images showing a trajectory on the line connecting the imaging position of the newly displayed image and the imaging position of the previously displayed image.

The second map may be a map shown by orthographic projection.

According to an embodiment of the present disclosure, there is provided an information processing method including acquiring multiple images to which position information showing an imaging position is attached, and displaying a first map on which a pointer indicating the imaging position shown by the position information is displayed while switching a reduced scale and a display area according to an operation of a user, and displaying a second map of a fixed reduced scale together with the first map while causing a display area to cooperate with a display area of the first map.

Advantageous Effects of Invention

According to the present technology, it is possible to intuitively check the imaging positions of images from a map.

BRIEF DESCRIPTION OF DRAWINGS

FIG. 14 is a diagram illustrating an example of scrolling on a planar map in an image selection screen.

FIG. 20 is a diagram illustrating an animation example.

FIG. 22 is a diagram illustrating an animation example following FIG. 21.

DESCRIPTION OF EMBODIMENTS

Figure 1:
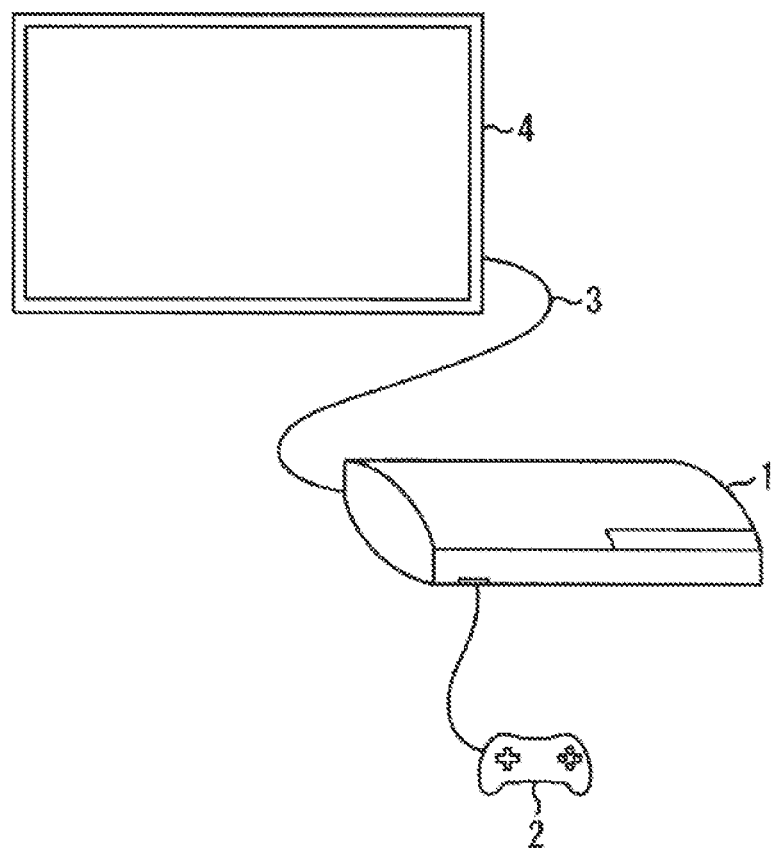
FIG. 1 is a diagram illustrating the appearance of an information processing device according to one embodiment of the present technology.

FIG. 1 is a diagram illustrating the appearance of an information processing device according to an embodiment of the present technology.

A controller 2 in which various buttons such as a cross button are installed is connected with an information processing device 1. The user operates the information processing device 1 by the use of the controller 2.

A display device 4 having a display such as an LCD (Liquid Crystal Display) is connected with the information processing device 1 through a cable 3 such as an HDMI (High Definition Multimedia Interface) cable. Various screens are displayed on the display of the display device 4 on the basis of data output from the information processing device 1.

In the information processing device 1, there is prepared an image management application that is an application to import an image taken using a portable terminal such as a digital camera and a portable telephone with a camera function and manage the imported image. The image import is performed through a recording medium such as a memory card and a USB (Universal Serial Bus) memory or through wire or wireless communication performed between the information processing device 1 and the portable terminal.

Information on the imaging time and information on the imaging position are added to a file of an image imported by the information processing device 1 as metadata. For example, the imaging position of each image is shown by latitude and longitude, and used to display a pointer on the imaging position of each image on a map.

<Display Screen of Image Management Application>

Figure 2:
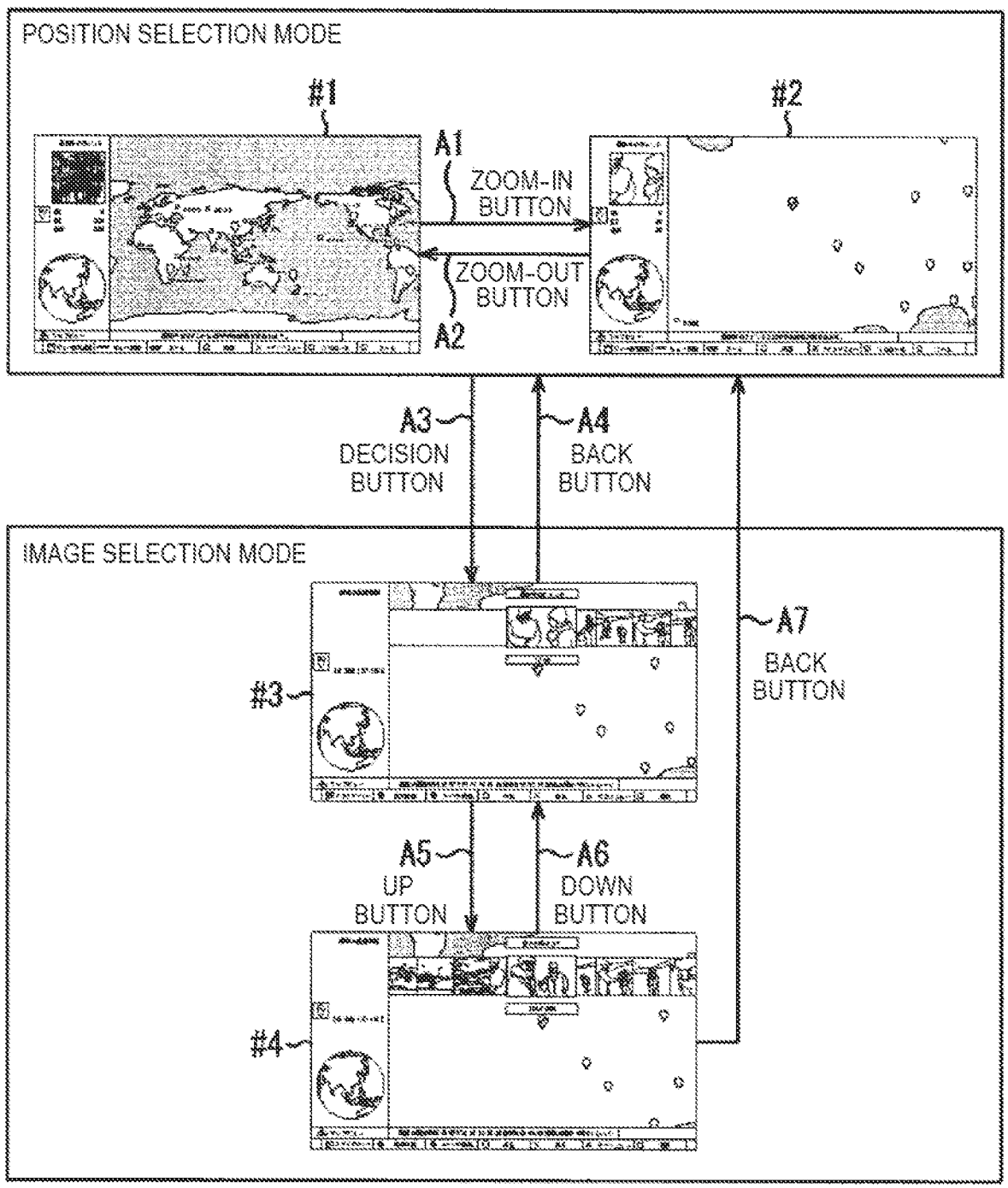
FIG. 2 is a diagram illustrating an example of the switching of screen display by an image management application.

FIG. 2 is a diagram illustrating an example of switching a screen displayed on the display of the display device 4 by an image management application.

The activation of the image management application is performed, for example, when the user givens an instruction from a menu screen of the information processing device 1. The modes of the image management application include a position selection mode and an image selection mode as illustrated in FIG. 2.

The position selection mode is a mode to select a predetermined pointer from pointers displayed on the map. The pointer shows that there is a taken image in the position in which it is displayed. The image taken in the position shown by the pointer includes not only the image taken in the position shown by the pointer but also an image taken within a predetermined range centering on the position shown by the pointer.

The image selection mode is a mode to select a predetermined image from images taken in the positions of the pointers selected in the position selection mode.

When the image management application is activated, for example, position selection screen #1 in the upper left of FIG. 2 is displayed on the display of the display device 4.

Figure 3:
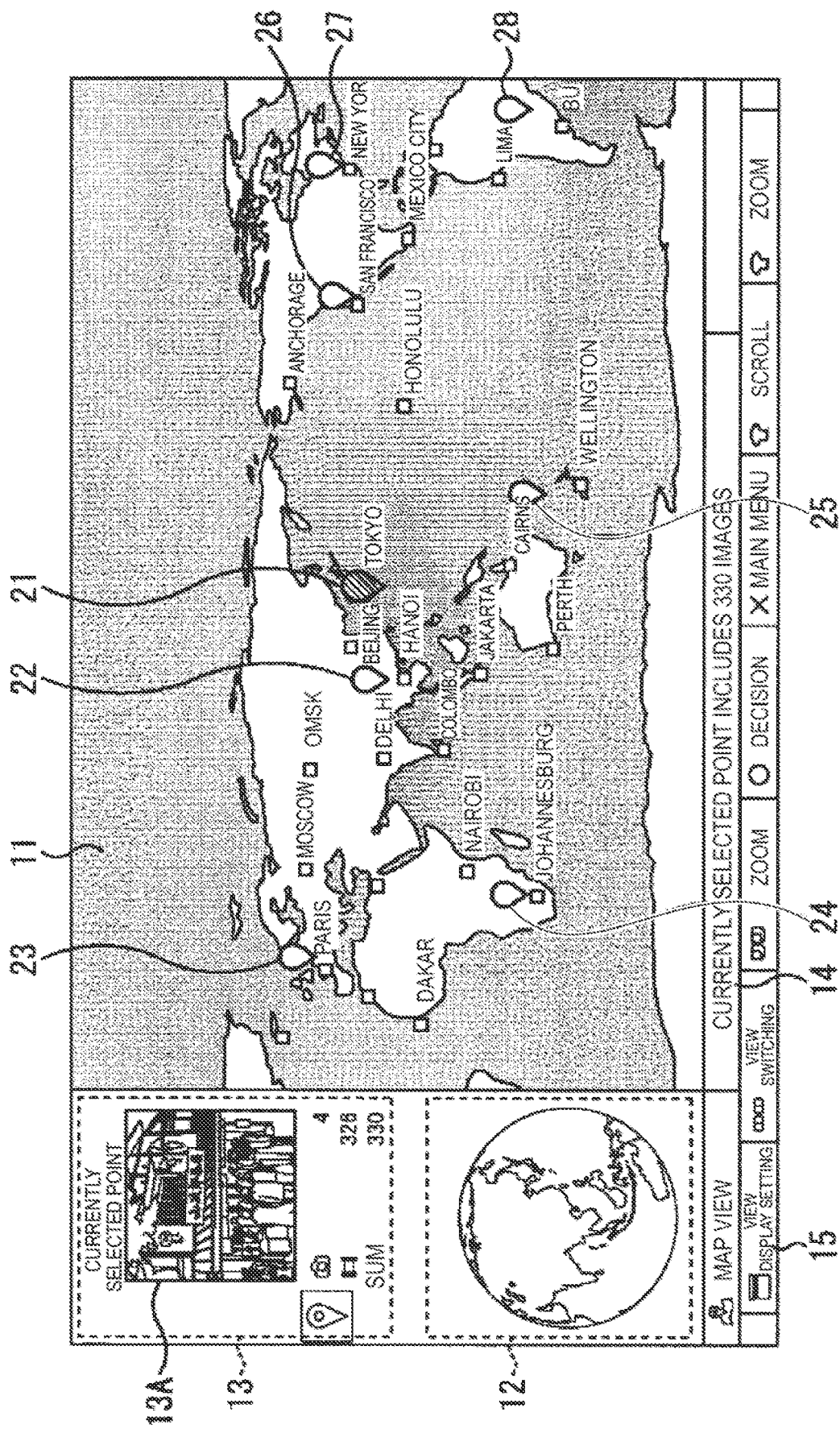
FIG. 3 is a diagram illustrating position selection screen #1 of FIG. 2.

FIG. 3 is a diagram illustrating position selection screen #1 of FIG. 2.

Position selection screen #1 is chiefly configured with a planar map area 11 and a spherical map area 12 and pointer information display area 13 that are formed on the left side of the planar map area 11. A message area 14 is formed below the planar map area 11 and a button explanation area 15 is formed below the message area 14.

A map shown by a predetermined projection method such as the Mercator projection is displayed on the planar map area 11 that occupies a wide range of position selection screen #1. The map of the planar map area 11 is designed such that the user can select the reduced scale and an area to be displayed, and, in a case where there is an image taken in the display area at that time, a pointer is displayed on the map.

In the example of FIG. 3, a map showing the entire world is displayed on the planar map area 11, and pointers 21 to 28 are displayed on the map. For example, the pointer 21 is a pointer indicating the vicinity of Japan, and, by this means, it is shown that there is an image taken in Japan.

Moreover, the pointer 21 is selected in the example of FIG. 3. The attachment of diagonal lines to the pointer 21 in FIG. 3 shows that the pointer 21 is in a state where it is selected, and that it is displayed in a different color from other pointers. For example, the user can select other pointers by pressing a cursor movement button.

A circle showing the shape of the earth is displayed on the spherical map area 12. A map shown by the orthographic projection, that is, a map showing a state where the earth is seen from a distance is displayed in the circle displayed on the spherical map area 12. The map displayed on the spherical map area 12 is a wide-area map of a fixed reduced scale, and the display area is switched in tandem with the display of the map displayed on the planar map area 11. For example, the display area of the map of the spherical map area 12 is switched such that, when a predetermined pointer is selected from the map displayed in the planar map area 11, an area including the selected pointer locates in a predetermined position such as the center.

In the example of FIG. 3, a map including areas in the vicinity of Japan is displayed in tandem with the selection of the pointer 21 from the map of the planar map area 11.

In the following, the map displayed on the planar map area 11 is arbitrarily referred to as "planar map". Moreover, the map displayed on the spherical map area 12 is referred to as "spherical map".

Information on a pointer selected from the planar map is displayed on the pointer information display area 13. Since it is an area in which the information on the selected pointer is displayed, the display on the pointer information display area 13 is also switched in tandem with the display of the planar map and the spherical map.

In the pointer information display area 13, a representative image 13A selected from images taken in the position of the selected pointer and information on the number of images taken in the position of the selected pointer are displayed. The example of FIG. 3 displays information showing that the number of still images taken in the position indicated by the pointer 21 is 4, the number of moving images taken in the position indicated by the pointer 21 is 326 and totally 330 images are managed as images taken in the position indicated by the pointer 21.

Various messages related to an operation are displayed on the message area 14.

Information on operations assigned to the buttons of the controller 2 is displayed on the button explanation area 15. When main operations are described, in the example of FIG. 3, operations of zoom and decision are assigned to predetermined buttons of the controller 2.

The zoom is an operation used to increase (zoom in) and decrease (zoom out) the reduced scale of the planar map. Every time a zoom-in button that is a button assigned for zoom-in is pressed, the reduced scale increases and the planar map of a narrower area is displayed on the planar map area 11. Every time a zoom-out button that is a button assigned for zoom-out is pressed, the reduced scale decreases and the planar map of a wider area is displayed on the planar map area 11.

The decision is an operation used when a pointer in a selective state is decided. When a decision button that is a button assigned for the decision is pressed, selection of the pointer in the selective state is fixed and the image selection mode screen is displayed instead of the position selection mode screen.

Cursor movement that is an operation used at the time of switching the pointer on the planar map is assigned to the cross button of the controller 2. Every time the cursor movement button that is a button assigned for the cursor movement is pressed, the pointer in the selective state is switched from the currently selected pointer to a close pointer.

The user can select an area displayed on the planar map area 11 by the use of position selection screen #1 having such a configuration. Moreover, the user can confirm the position of the area displayed on the planar map area 11 in the entire earth from the spherical map and select a pointer.

Returning to the explanation of FIG. 2, when the zoom-in button is pressed predetermined times in a state where position selection screen #1 is displayed, as shown by the point of arrow A1, position selection screen #2 is displayed on the display of the display device 4 instead of position selection screen #1. The reduced scale of the planar map displayed on the planar map area 11 increases by a predetermined amount every time the zoom-in button is pressed, and the planar map of a narrower area is displayed.

Figure 4:
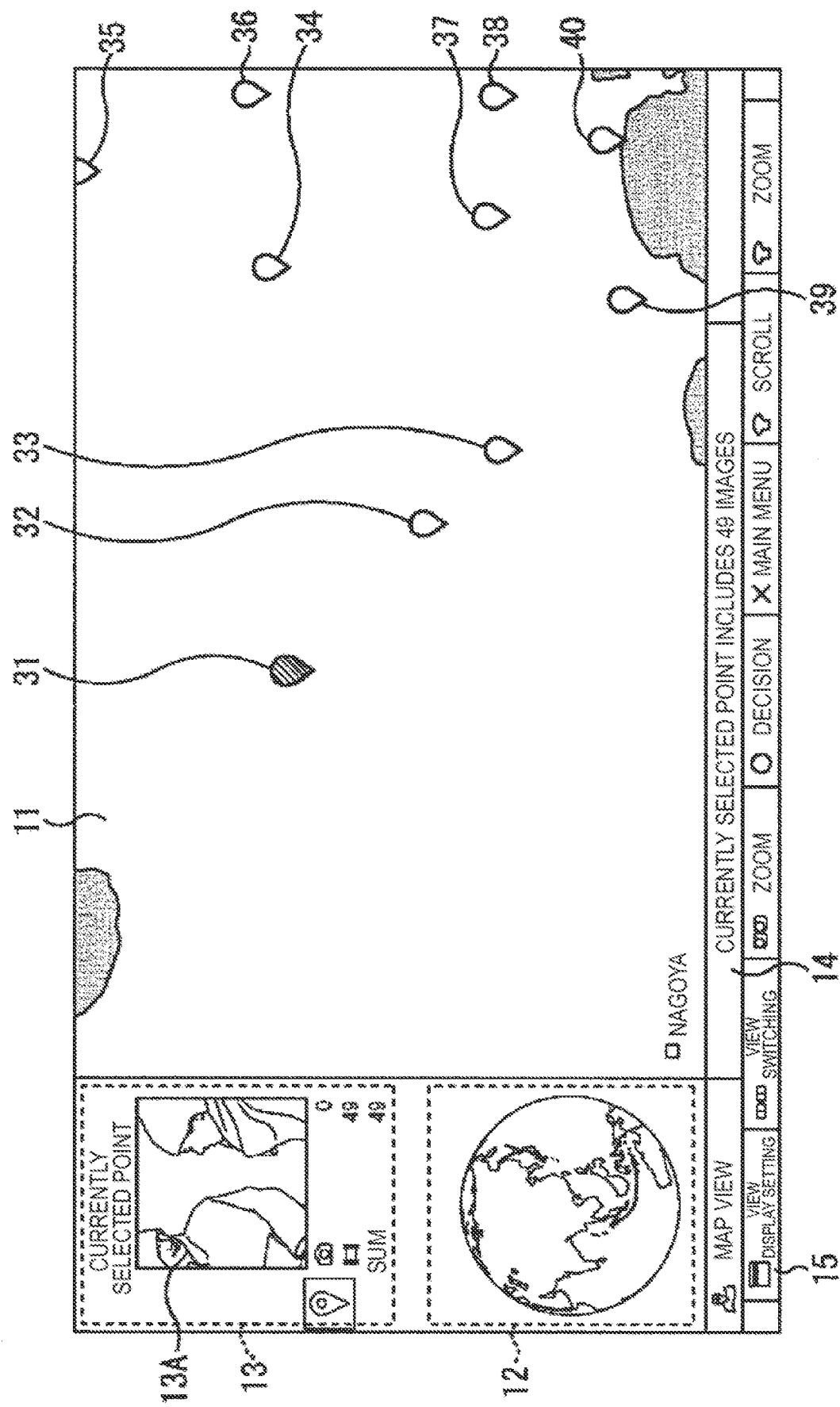
FIG. 4 is a diagram illustrating position selection screen #2 of FIG. 2.

FIG. 4 is a diagram illustrating position selection screen #2 in FIG. 2.

The configuration of position selection screen #2 is the same as the configuration of position selection screen #1 described with reference to FIG. 3. The overlapping explanation is arbitrarily omitted. According to the press of the zoom-in button, the planar map of a predetermined area in Japan, which is narrower than the display area (the entire world) of the planar map of position selection screen #1, is displayed on the planar map area 11. Here, in the planar map, the colored part corresponds to the sea and the other parts correspond to the land.

Pointers 31 to 40 are displayed on the planar map in FIG. 4. As described above, the pointer indicates the imaging position of an image, and, although the image taken in the position of the pointer includes an image taken in a predetermined range centering on the position of the pointer, the predetermined range is switched according to the reduced scale of the planar map.

In the example of FIG. 4, the pointer 31 is selected from the pointers 31 to 40. In the pointer information display area 13, the representative image 13A that is a representative image of images taken in the position of the pointer 31 and information on the number of images taken in the position of the pointer 31 are displayed.

Returning to the explanation of FIG. 2, when the zoom-out button is pressed by predetermined times in a state where position selection screen #2 is displayed, the display of the display device 4 returns to position selection screen #1 indicated by arrow A2. The reduced scale of the planar map displayed on the planar map area 11 decreases by a predetermined amount every time the zoom-out button is pressed, and the planar map of a wider area is displayed.

When the decision button is pressed once in a state where position selection screen #1 or position selection screen #2 is displayed, the mode of the image management application is switched from the position selection mode to the image selection mode as shown by the point of arrow A3. Image selection screen #3 that is a screen of the image selection mode is displayed on the display of the display device 4.

Figure 5:
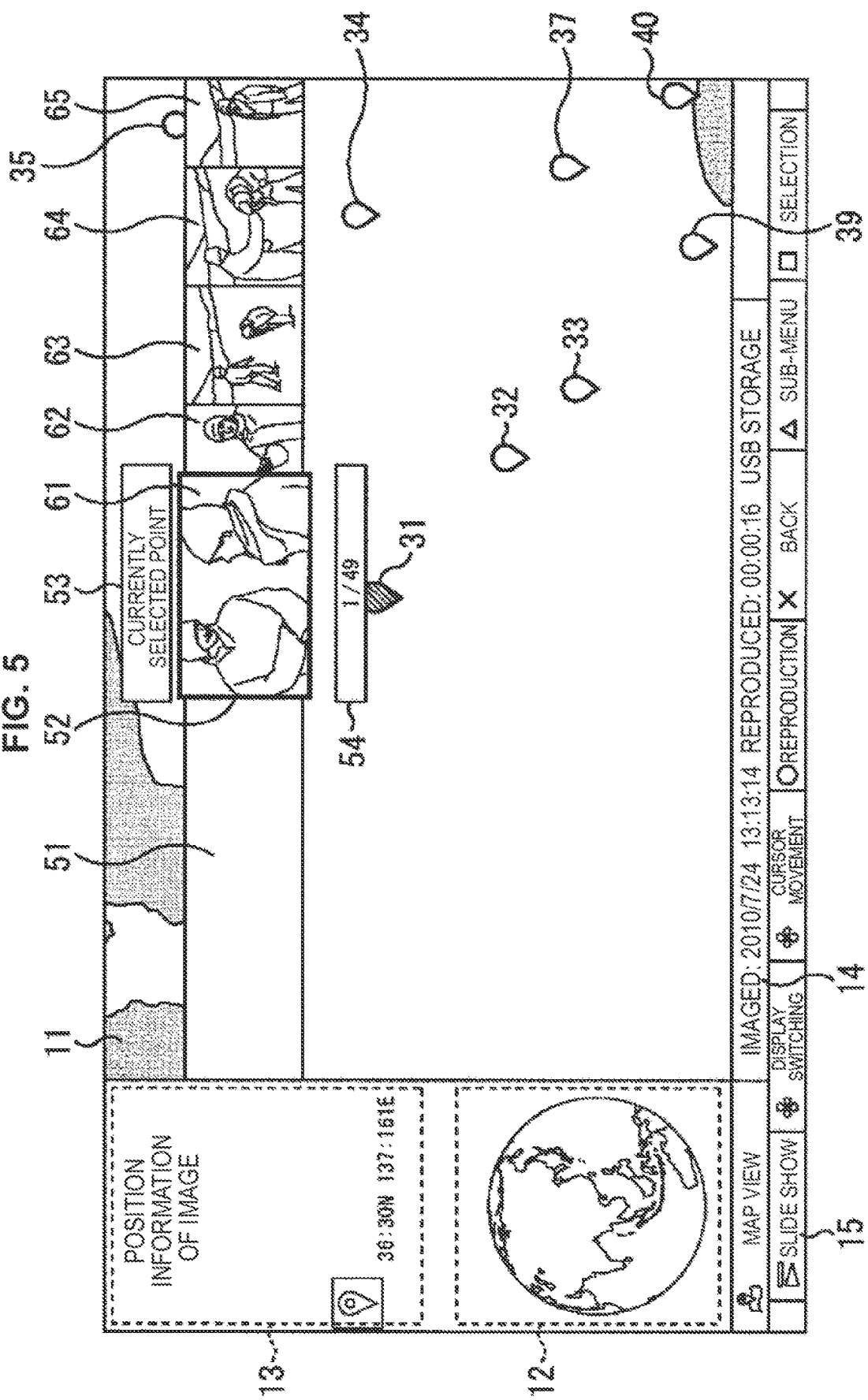
FIG. 5 is a diagram illustrating image selection screen #3 of FIG. 2.

FIG. 5 is a diagram illustrating image selection screen #3 in FIG. 2.

Image selection screen #3 is also mainly configured with the planar map area 11, the spherical map area 12 and the pointer information display area 13. The message area 14 is formed below the planar map area 11 and the button explanation area 15 is formed below the message area 14.

Image selection screen #3 in FIG. 5 is a screen at the time when the decision button is pressed once in position selection screen #2 in which the planar map of a certain area in Japan is displayed on the planar map area 11. The display of the planar map and the spherical map is the same as the display in position selection screen #2.

A time series area 51 that is a horizontal belt-like area is overlapped over the planar map and displayed on the planar map area 11 of image selection screen #3. The time series area 51 displays the time series of images taken in the position of the pointer 31 that is the currently selected pointer. The arrangement order of the images forming the time series is, for example, the imaging time order specified on the basis of information added to a file as metadata.

In the example of FIG. 5, a cursor 52 is displayed in the middle of the time series area 51, and an image 61 is displayed while being enclosed by the cursor 52. The image displayed while being enclosed by the cursor 52 is a selection image selected by the user. The image 61 is an image in which, for example, the imaging time is the earliest among images taken in the position indicated by the pointer 31.

Images 62 to 65 are displayed on the right side of the image 61 while other images are partially overlapped. By pressing a cursor movement button described later, the user can shift the time series of the images while maintaining the arrangement, and switch the selection image to other images.

In an area 53 on the cursor 52, information showing the display mode of the image selection screen is displayed. As the display mode of the image selection screen, there are prepared a mode to display the time series of images taken in the position of one currently-selected pointer and a mode to display the time series of images taken in the positions of all pointers, that is, all images. In the example of FIG. 5, the area 53 displays characters of "currently selected pointer" showing that the display mode of image selection screen #3 is a mode to display the time series of images taken in the position indicated by the currently selected pointer (the pointer 31).

In an area 54 below the cursor 52, information showing the image number of the selection image is displayed. In the example of FIG. 5, the area 54 displays numerals showing that there are 49 images taken in the position of the currently selected pointer and the first image among those is selected.

In the pointer information display area 13, information on the latitude and longitude of the position of the currently selected pointer is displayed.

In the button explanation area 15, explanation of selectable operations at the time of the image selection mode is displayed. When main operations are described, in the example of FIG. 5, each operation of "slide show", "display switching", "reproduction" and "back" is assigned to a predetermined button of the controller 2.

The "slide show" is an operation used when the slide show for images taken in the position of the currently selected pointer starts. When a slide show button that is a button assigned to the slide show is pressed once, instead of image selection screen #3, images forming the time series displayed on the time series area 51 are expanded and displayed on the display of the display device 4 one by one in order of, for example, imaging time.

The "display switching" is an operation used when the display mode of the image selection screen is switched. For example, the up and down buttons of the cross button of the controller 2 are assigned to the display switching. When the up button on is pressed once in a state where the mode to display the time series of images taken in the position of one pointer is selected, the display mode of the image selection screen is switched to the mode to display the time series of images taken in the positions of all pointers. By contrast, when the down button is pressed once in a state where the mode to display the time series of images taken in the positions of all pointers is selected, the display mode of the image selection screen is switched to the mode to display the time series of images taken in the position of one pointer.

The "cursor movement" is an operation used when the selection image is switched. For example, the right and left buttons of the cross button of the controller 2 are assigned to the cursor movement. When the left button is pressed once, the entire time series of images shifts in the right direction by one image and the selection image is switched to the image at the immediate left of an image selected until then. Meanwhile, when the right button is pressed once, the entire time series of images shifts in the left direction by one image and the selection image is switched to the image at the immediate right of an image selected until then.

The "reproduction" is an operation used when the selection image is expanded and displayed. When a reproduction button that is a button assigned to the reproduction is pressed, instead of image selection screen #3, the selection image is expanded and displayed on the display of the display device 4.

The "back" is an operation used when the mode of the image management application is switched from the image selection mode to the position selection mode. When a back button that is a button assigned to the back is pressed, the position selection screen is displayed on the display of the display device 4.

The user can select, expand and display a predetermined image among images taken in the position indicated by the pointer 31, by the use of image selection screen #3 having such a configuration. Moreover, the user can start the slide show of the images taken in the position indicated by the pointer 31.

Returning to the explanation of FIG. 2, when the back button is pressed once in a state where image selection screen #3 is displayed, the mode of the image management application is switched from the image selection mode to the position selection mode. As shown by the point of arrow A4, the screen of the display of the display device 4 returns to the position selection screen in a state before the decision button is pressed.

Moreover, when the up button is pressed once in a state where image selection screen #3 is displayed, as shown by the point of arrow A5, image selection screen #4 is displayed on the display of the display device 4 instead of image selection screen #3. Image selection screen #4 is a screen at the time when the display mode of the image selection screen is the mode to display the time series of images taken in the positions of all pointers.

Figure 6:
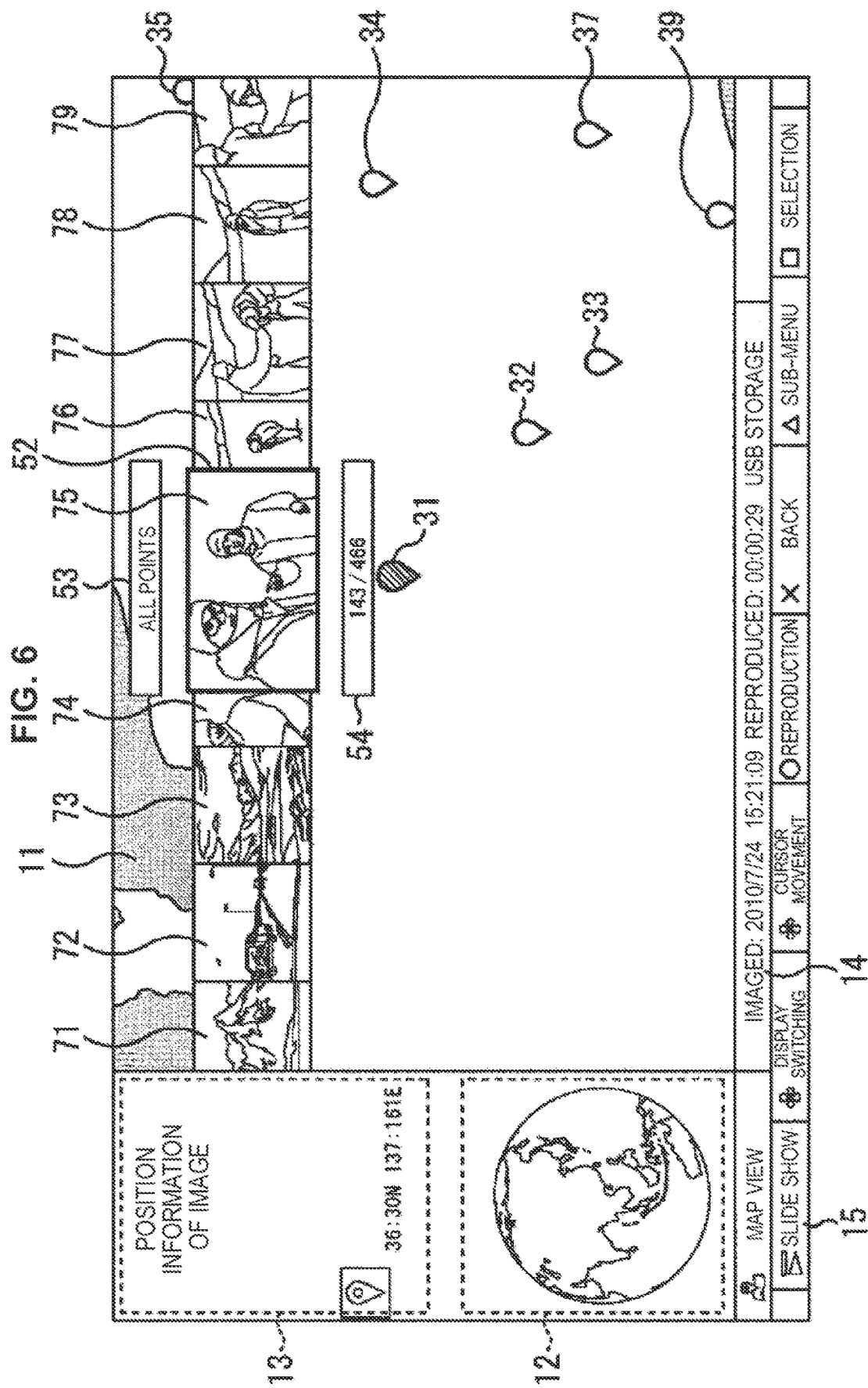
FIG. 6 is a diagram illustrating image selection screen #4 of FIG. 2.

FIG. 6 is a diagram illustrating image selection screen #4 in FIG. 2.

The configuration of image selection screen #4 is the same as the configuration of image selection screen #3 in FIG. 5. The overlapping explanation is arbitrarily omitted.

The time series of the images taken in the positions of all pointers is displayed on the time series area 51 of image selection screen #4.

In the example of FIG. 6, images 71 to 79 are displayed and the image 75 among those is selected. The other images than the image 75 among the images 71 to 79 are displayed while the other images are partially overlapped.

The area 53 displays characters "all points" showing that the display mode of image selection screen #4 is the mode to display the time series of the images taken in the positions of all pointers. Moreover, the area 54 displays numerals showing that there are 466 images and the 143rd image is selected.

The user can select a predetermined image from the time series of the images taken in the positions of all pointers by the use of image selection screen #4 having such a configuration.

In a case where the selection image is switched by pressing the right button or the left button, when the imaging position is different between a newly selected image and the previously selected image, the display of the planar map is switched such that an area including the imaging position of the newly selected image is displayed. Moreover, the display of the spherical map is switched in tandem with the switching of the display of the planar map.

Moreover, the user can start the slide show for the images taken in the positions of all pointers by the use of image selection screen #4. That is, images targeted for the slide show are different between a case where the display mode of the image selection screen is a mode to display the time series of the images taken in the positions of all pointers and a case where the display mode of the image selection screen is a mode to display the time series of the images taken in the position of one pointer.

At the time of the slide show, when the imaging position is different between a newly displayed image and the previously displayed image, an animation showing the movement from the imaging position of the previously displayed image to the imaging position of the newly displayed image is displayed before the display of the new image.

The switching of the display of the planar map in a case where the selection image is switched and the animation displayed at the time of the slide show are described later.

Returning to the explanation of FIG. 2, when the down button is pressed once in a state where image selection screen #4 is displayed, as shown by the point of arrow A6, image selection screen #3 is displayed on the display of the display device 4 instead of image selection screen #4.

Moreover, when the back button is pressed once in a state where image selection screen #4 is displayed, the mode of the image management application is switched from the image selection mode to the position selection mode. As shown by the point of arrow A7, the screen of the display of the display device 4 returns to the position selection screen in a state before the decision button is pressed.

As described above, the user can switch between the image selection mode and the position selection mode by one button operation. Moreover, after selecting the image selection mode and displaying the image selection screen, the user can switch between a mode to display the time series of only images taken in a nearby place and a mode to display the time series of all images by one button operation.

As described above, a series of operations of the information processing device 1 that switches the display of a display are described later with reference to flowcharts.

<Configuration Example of Information Processing Device 1>

Figure 7:
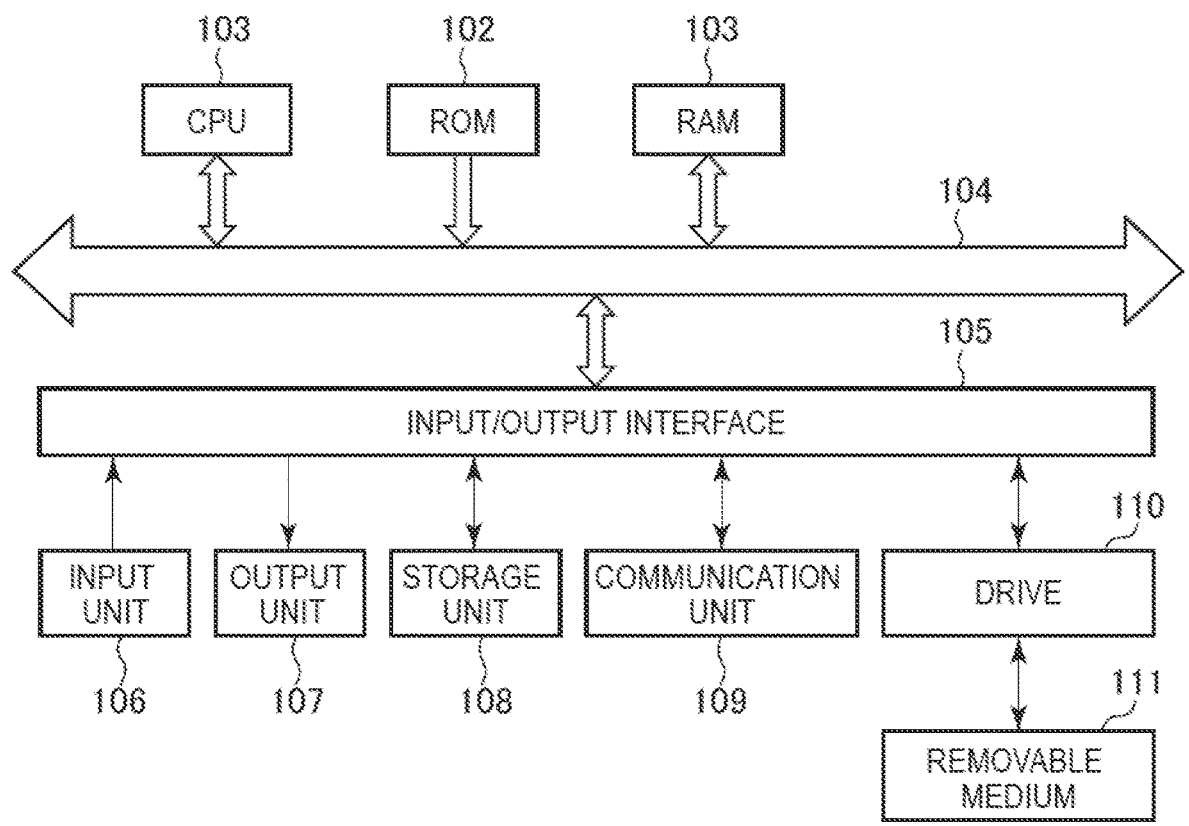
FIG. 7 is a block diagram illustrating a configuration example of hardware of an information processing device.

FIG. 7 is a block diagram illustrating a configuration example of hardware of the information processing device 1.

A CPU (Central Processing Unit) 101, a ROM (Read Only Memory) 102 and a RAM (Random Access Memory) 103 are mutually connected by a bus 104. Further, an input/output interface 105 is connected with the bus 104. An input unit 106, an output unit 107, a storage unit 108, a communication unit 109, and a drive 110 are connected with the input/output interface 105.

The input unit 106 detects the user's operation with respect to the controller 2 and outputs a signal showing the content of the user's operation to the CPU 101. The output unit 107 outputs data of the screen of an image management application to the display device 4 through the cable 3 and performs display control of the display of the display device 4. The storage unit 108 is formed with a hard disk and a flash memory, and so on, and stores an image file imported in the information processing device 1. The image file stored in the storage unit 108 is arbitrarily read out by the image management application.

The communication unit 109 performs data transmission and reception with a device connected via a network or a portable terminal connected via wire or wireless communication. The communication unit 109 outputs an image file transmitted from external equipment to the storage unit 108 to store it. The drive 110 drives a removable medium 111 such as an optical disc attached to the information processing device 1 or a USB thumb drive, and reads out an image file stored in the removable medium 111. The drive 110 outputs the image file read out from the removable medium 111 to the storage unit 108 to store it.

Figure 8:
FIG. 8 is a block diagram illustrating a functional configuration example of an information processing device.

FIG. 8 is a block diagram illustrating a functional configuration example of the information processing device 1.

At least part of the function units illustrated in FIG. 8 is realized by executing an image management application by the CPU 101 in FIG. 7. In the information processing device 1, an image acquisition unit 121 and a display control unit 122 are realized.

The image acquisition unit 121 acquires an image file stored in the storage unit 108. Moreover, the image acquisition unit 121 controls the drive 110 to read out and acquire an image file from the removable medium 111. The image acquisition unit 121 outputs the acquired image files to the display control unit 122. The image files output to the display control unit 122 include image data and metadata such as information on the imaging time and information on the imaging position.

The display control unit 122 performs display control of the display of the display device 4 as described with reference to FIG. 2 or the like, according to the user's operation indicated by a signal supplied from the input unit 106.

<Operation of the Information Processing Device 1>

Here, the operation of the information processing device 1 having the above-mentioned configuration is described.

First, the entire operation of an image management application is described with reference to the flowchart in FIG. 9. The processing in FIG. 9 starts when the image management application is activated. When the image management application is activated, an image file is acquired by the image acquisition unit 121 and supplied to the display control unit 122.

In step S1, the display control unit 122 performs processing of a position selection mode. By the processing of the position selection mode, the position selection screen as described above is displayed on the display of the information processing device 1, and the screen display is switched according to the user's operation. The processing of the position selection mode is described later with reference to the flowchart in FIG. 10.

In step S2, the display control unit 122 performs processing of an image selection mode. By the processing of the image selection mode, the image selection screen as described above is displayed on the display of the information processing device 1, and the screen display is switched according to the user's operation. The processing of the image selection mode is described later with reference to the flowcharts in FIGS. 11 and 12.

Figure 9:
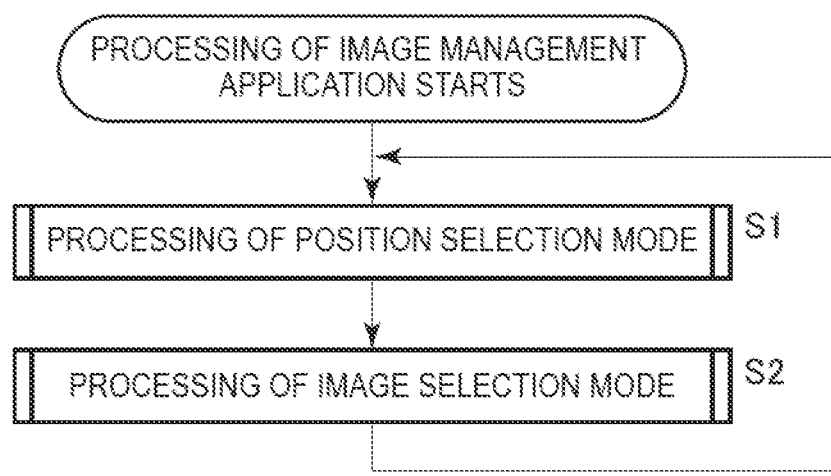
FIG. 9 is a flowchart describing the entire operation of an image management application.
Figure 10:
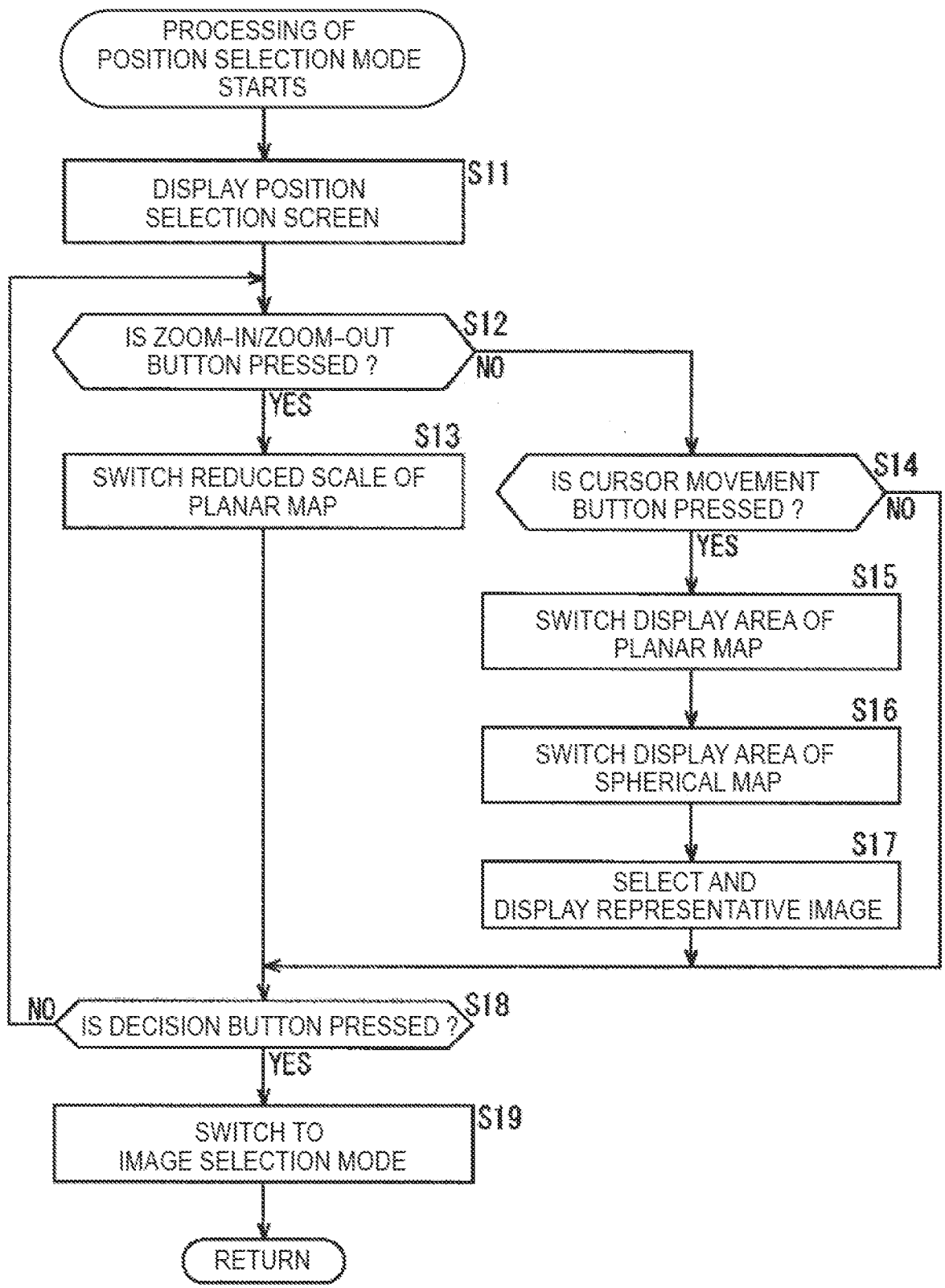
FIG. 10 is a flowchart describing processing of a position selection mode executed in step S1 of FIG. 9.

Next, the processing of the position selection mode performed in step S1 of FIG. 9 is described with reference to the flowchart in FIG. 10.

In step S11, the display control unit 122 displays the position selection screen. For example, in the position selection screen immediately after the activation of the image management application, the planar map of the entire world as described with reference to FIG. 3 is displayed on the planar map area 11.

In step S12, the display control unit 122 determines a zoom-in button or a zoom-out button is pressed.

In a case where it is determined in step S12 that the zoom-in button or the zoom-out button is pressed, in step S13, for example, the display control unit 122 switches the reduced scale of the planar map displayed on the planar map area 11, with respect to the position of a selected pointer.

Meanwhile, in a case where it is determined in step S12 that the zoom-in button or the zoom-out button is not pressed, in step S14, the display control unit 122 determines whether a cursor movement button is pressed.

In a case where it is determined in step S14 that the cursor movement button is pressed, in step S15, the display control unit 122 switches the area of the planar map displayed on the planar map area 11 such that, for example, a newly selected pointer comes to the center.

In step S16, in tandem with the switching of the display of the planar map, the display control unit 122 switches the display area of a spherical map such that, for example, the position corresponding to a pointer selected from the planar map comes to the center.

Here, the processing in steps S15 and S16 may not be performed when the planar map of the entire world is displayed on the planar map area 11 as illustrated in FIG. 3, and may be performed only in a case where the zoom-in button is pressed only predetermined times and the reduced scale of the planar map is larger than a threshold.

In step S17, the display control unit 122 selects a predetermined image from images taken in the position of the selected pointer and displays it on the pointer information display area 13 as a representative image. Moreover, the display control unit 122 displays information showing the number of images on the pointer information display area 13.

After the processing in steps S13 and S17 or it is determined in step S14 that the cursor movement button is not pressed, in step S18, the display control unit 122 determines whether the decision button is pressed.

In a case where it is determined in step S18 that the decision button is not pressed, the display control unit 122 returns to step S12 and repeats the above-mentioned processing.

On the other hand, in a case where it is determined in step S18 that the decision button is pressed, in step S19, the display control unit 122 switches the mode of the image management application to the image selection mode. Afterward, it returns to step S1 in FIG. 9 and the subsequent processing is performed.

Next, the processing of the image selection mode performed in step S2 in FIG. 9 is described with reference to the flowcharts in FIGS. 11 and 12.

In step S31, the display control unit 122 displays the image selection screen as illustrated in FIG. 5 including the time series of images taken in the position of a pointer selected from the position selection screen.

In step S32, the display control unit 122 determines whether the up button is pressed. As described with reference to FIG. 5, an operation to switch the display mode of the image selection screen to a mode to display the time series of images taken in the positions of all pointers is assigned to the up button of the controller 2.

In a case where it is determined in step S32 that the up button is not pressed, in step S33, the display control unit 122 determines whether the cursor movement button is pressed.

In a case where it is determined in step S33 that the cursor movement button is pressed, in step S34, the display control unit 122 shifts the entire time series of the images to the right or left and switches the selection image. In a case where it is determined in step S33 that the cursor movement button is not pressed, the processing in step S34 is skipped.

In step S35, the display control unit 122 determines whether the reproduction button is pressed.

In a case where it is determined in step S35 that the reproduction button is pressed, in step S36, the display control unit 122 reproduces the selection image.

In a case where the selection image is a still image, for example, the still image is reproduced such that the still image is displayed on the full screen instead of the image selection screen. The display of the still image is continued only for a predetermined time, and, after the elapse of the predetermined time, the display on the display returns to the display of the image selection screen. Moreover, in a case where the selection image is a moving image, the moving image is reproduced such that the reproduced moving image is displayed on the full screen instead of the image selection screen. After the reproduction of the moving image ends, the display on the display returns to the display of the image selection screen. In a case where it is determined in step S35 that the reproduction button is not pressed, the processing in step S36 is skipped.

In step S37, the display control unit 122 determines whether the slide show button is pressed.

In a case where it is determined in step S37 that the slide show button is pressed, the display control unit 122 performs slide show reproduction processing 1 in step S38. By slide show reproduction processing 1, a slide show for images taken in the position of the currently selected pointer is performed. Slide show reproduction processing 1 is described later with reference to the flowchart in FIG. 17. In a case where it is not determined in step S37 that the slide show button is not pressed, the processing in step S38 is skipped.

In step S39, the display control unit 122 determines whether the back button is pressed.

In a case where it is determined in step S39 that the back button is pressed, in step S40, the display control unit 122 switches the mode of the image management application to the position selection mode. Afterward, it returns to step S2 in FIG. 9 and the subsequent processing is performed.

On the other hand, in a case where it is determined in step S39 that the back button is not pressed, it returns to step S31 and the display control unit 122 repeats the above-mentioned processing.

Figure 12:
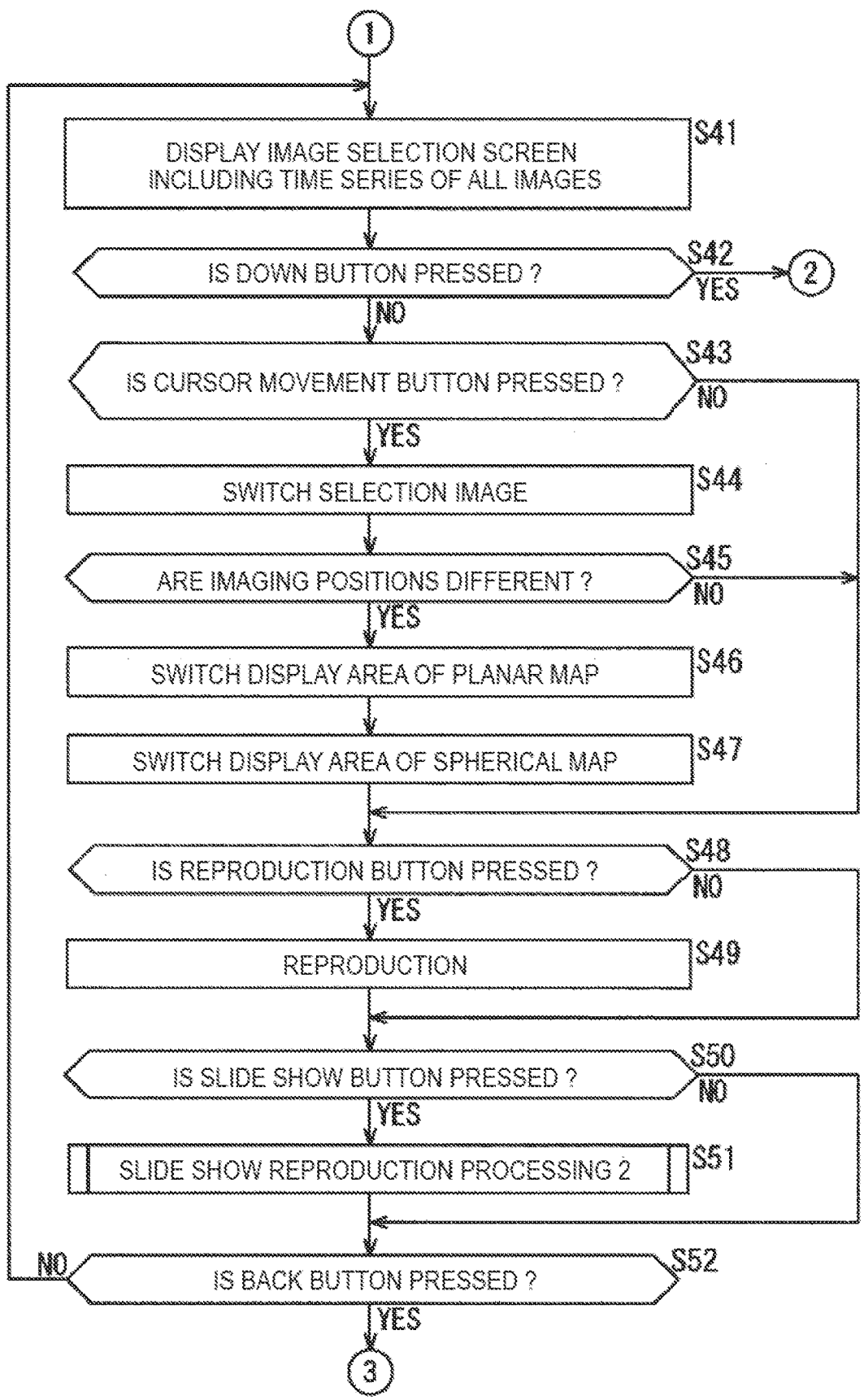
FIG. 12 is a flowchart describing processing of an image selection mode executed in step S2 of FIG. 9, which follows FIG. 11.

In a case where it is determined in step S32 that the up button is pressed, in step S41 in FIG. 12, the display control unit 122 displays the image selection screen as illustrated in FIG. 6 including the time series of images taken in the positions of all pointers.

In step S42, the display control unit 122 determines whether the down button is pressed. As described with reference to FIG. 5, an operation to switch the display mode of the image selection screen to a mode to display the time series of images taken in the position of one pointer is assigned to the down button of the controller 2.

Figure 11:
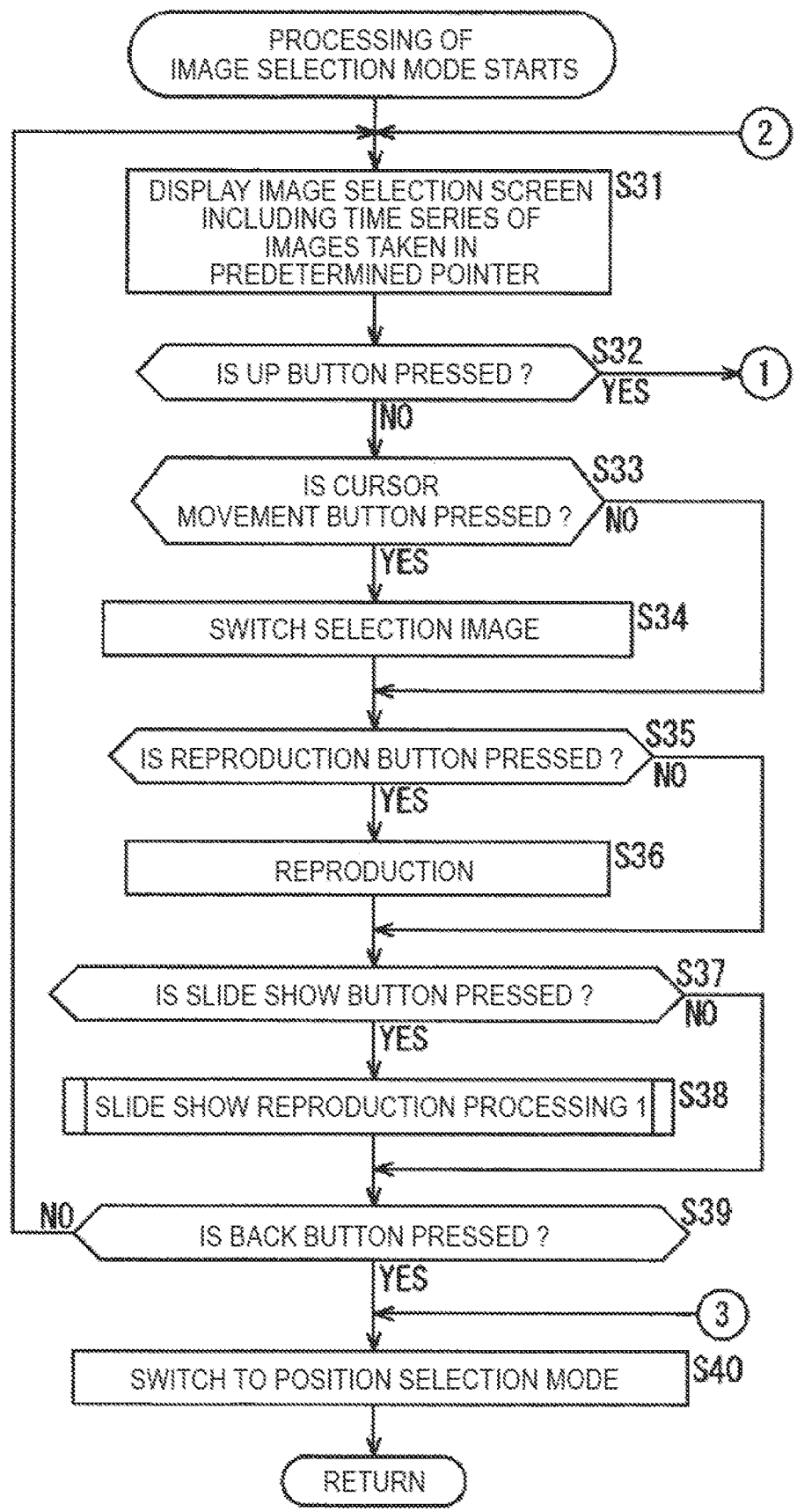
FIG. 11 is a flowchart describing processing of an image selection mode executed in step S2 of FIG. 9.

In a case where it is determined in step S42 that the down button is pressed, it returns to step S31 in FIG. 11 and the subsequent processing is performed. On the other hand, in a case where it is determined in step S42 that the down button is not pressed, in step S43, the display control unit 122 determines whether the cursor movement button is pressed.

In a case where it is determined in step S43 that the cursor movement button is pressed, in step S44, the display control unit 122 shifts the entire time series of the images to the right or left and switches the selection image.

In step S45, the display control unit 122 determines whether the imaging position of an image newly selected as the selection image and the imaging position of the previously selected image are different. In a case where the display mode of the image selection screen is a mode to display the time series of the images taken in the positions of all pointers, the time series of the images includes images taken in the positions of different pointers.

In a case where it is determined in step S45 that the imaging position of the newly selected image and the imaging position of the previously selected image are different, in step S46, the display control unit 122 switches the display area of the planar map such that, for example, a pointer indicating the imaging position of the newly selected image comes to the center.

In step S47, in tandem with the switching of the display of the planar map, the display control unit 122 switches the display area of the spherical map such that, for example, an area including the pointer indicating the imaging position of the newly selected image comes to the center.

Figure 13:
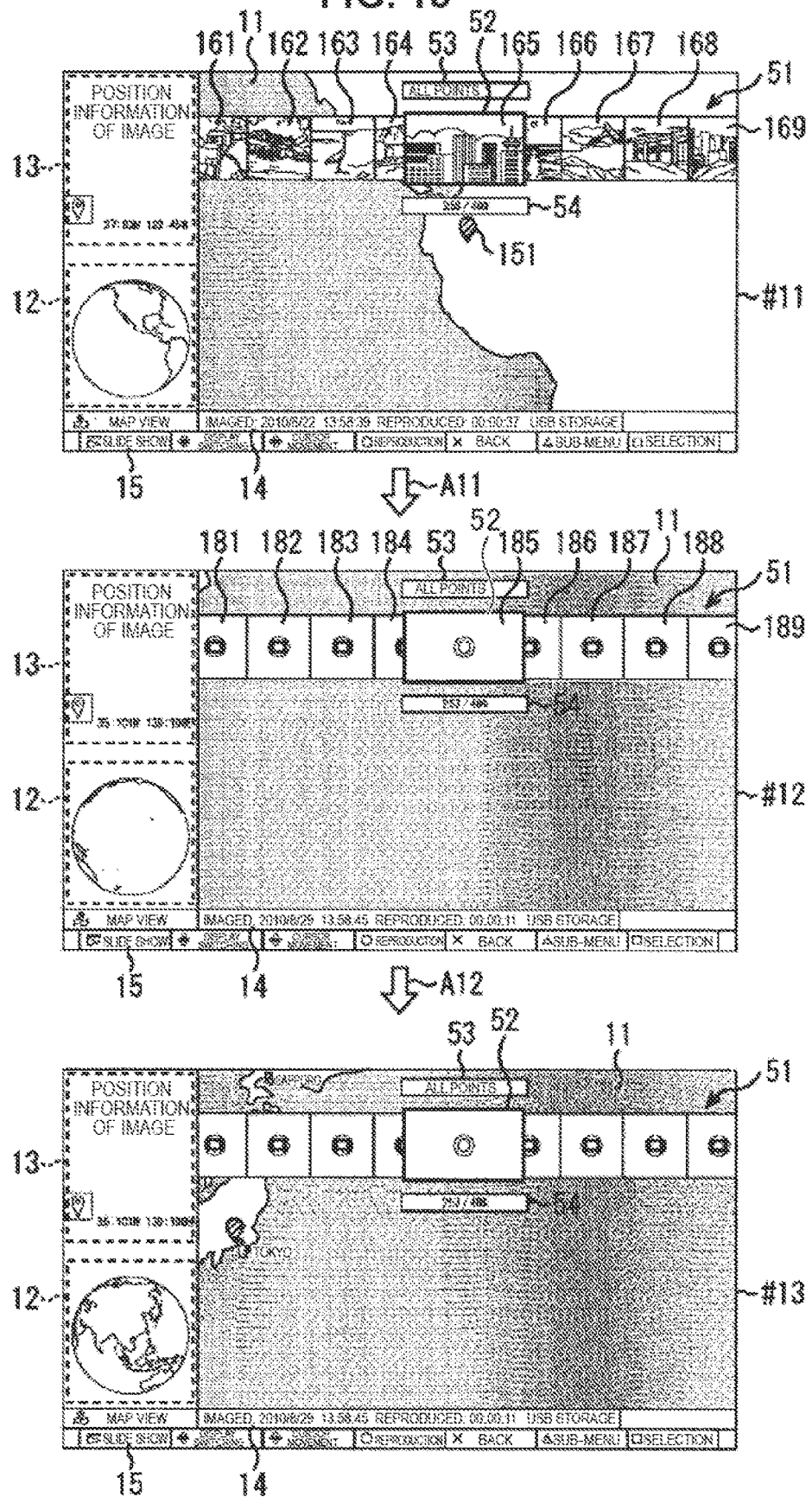
FIG. 13 is a diagram illustrating an example of scrolling on a planar map in an image selection screen.

FIGS. 13 and 14 are diagrams illustrating transition examples of the image selection screen in a case where the imaging position of the newly selected image and the imaging position of the previously selected image are different.

Screen #11 in FIG. 13 is a screen before the cursor movement button is pressed. The planar map of a certain area in the west coast of the United States is displayed on the planar map area 11 of screen #11, and a pointer 151 indicating a position in the area is selected. The spherical map centering on the vicinity of the west coast of the United States is displayed on the spherical map area 12.

The time series area 51 displays the time series of images 161 to 169 that are partial images of the images taken in the positions of all pointers, and the image 165 among those is selected. The image 165 is an image taken in the position of the pointer 151.

For example, a case is described where the image 164 that is the immediate left image of the image 165 is an image taken in Japan and the image 164 is newly selected according to the press of the cursor movement button. The imaging position of the image 164 that is a newly selected image and the imaging position of the image 165 that is the previously selected image are assumed to be different.

In this case, the planar map area 11 sequentially displays the planar map of each area in the direction from the United States that is the imaging position of the image 165 to Japan that is the imaging position of the image 164. That is, the planar map is scrolled from the state of screen #11 toward the direction of Japan and displayed.

Screen #12 indicated by the point of outlined arrow A11 is a screen in the middle of the scrolling of the planar map. The planar map area 11 displays the planar map of a certain area in the Pacific Ocean on the line connecting a position in the vicinity of the west coast of the United States which is the imaging position of the image 165 and a position in Japan in which the image 164 that is newly selected is taken. The spherical map area 12 displays a spherical map centering on the vicinity of the area displayed on the planar map area 11.

Since the display area of the planar map area 11 is far from the imaging position of the image 164 that is newly selected, images 181 to 189 showing the fact are displayed on the time series area 51 of screen #13.

Screen #13 indicated by the point of outlined arrow A12 and screen #14 in FIG. 14 are screens in the middle of the scrolling of the planar map. The planar map area 11 displays the planar map of areas that gradually become closer to Japan over time.

Screen #15 indicated by the point of outlined arrow A13 in FIG. 14 is a screen immediately after the scrolling of the planar map ends. The planar map area 11 of screen #15 displays the planar map of an area in Japan centering on the imaging position of the image 164 that is newly selected. Moreover, on the planar map, it is displayed in a state where a pointer 201 indicating the imaging position of the image 164 is selected. The spherical map area 12 of screen #15 displays a spherical map centering on the vicinity of Japan.

By scrolling the planar map in this way in a case where the imaging position of a newly selected image and the imaging position of the previously selected image are different, the user can easily understand the relationship between the imaging position of the image seen till then and the imaging position of the newly selected image.

At the time of the scrolling of the planar map, the planar map is displayed while changing the reduced scale in proportion to the distance from the imaging position of the previously selected image to the imaging position of the newly selected image.

Figure 15:
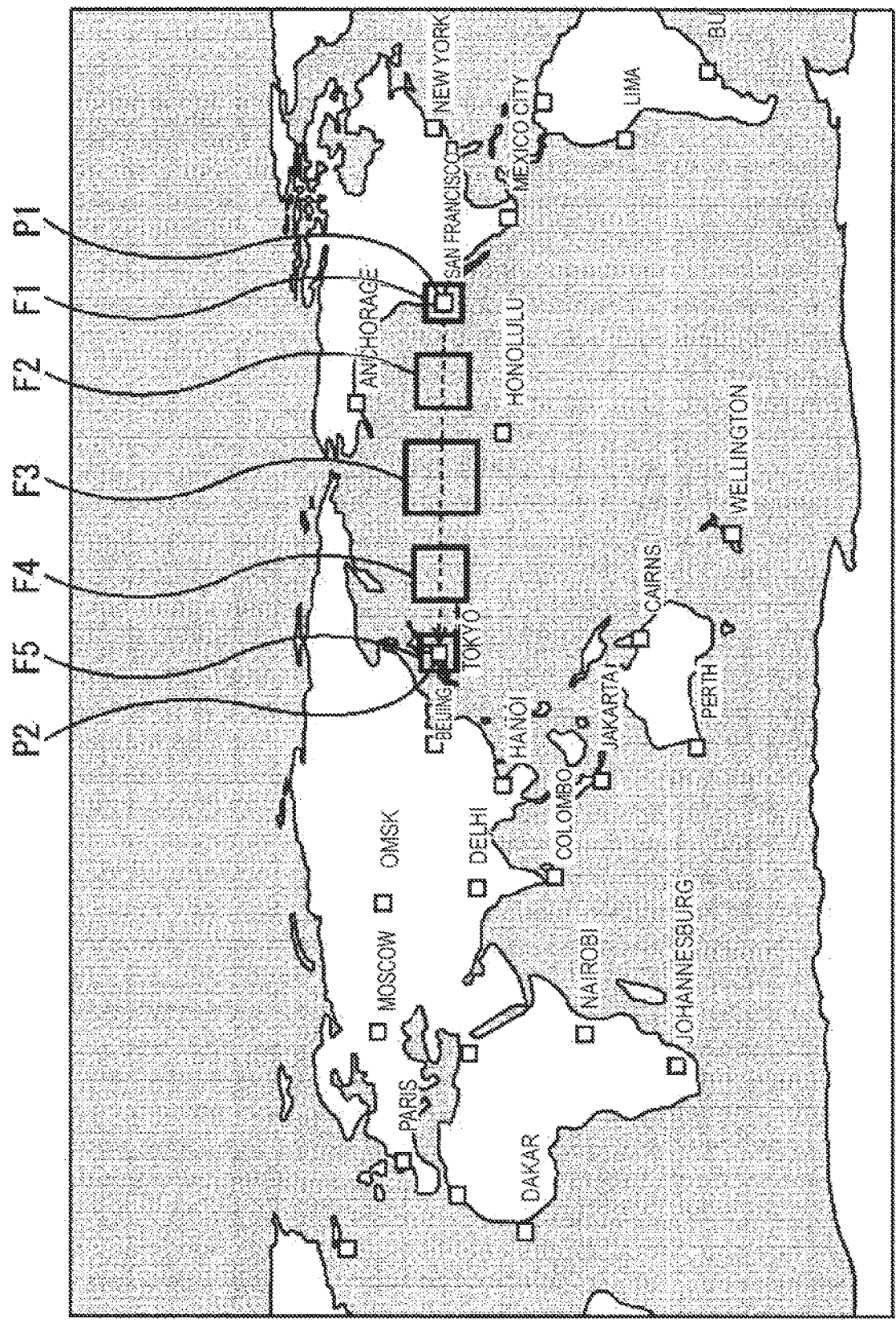
FIG. 15 is a diagram illustrating the change in the reduced scale of a planar map.
Figure 16:
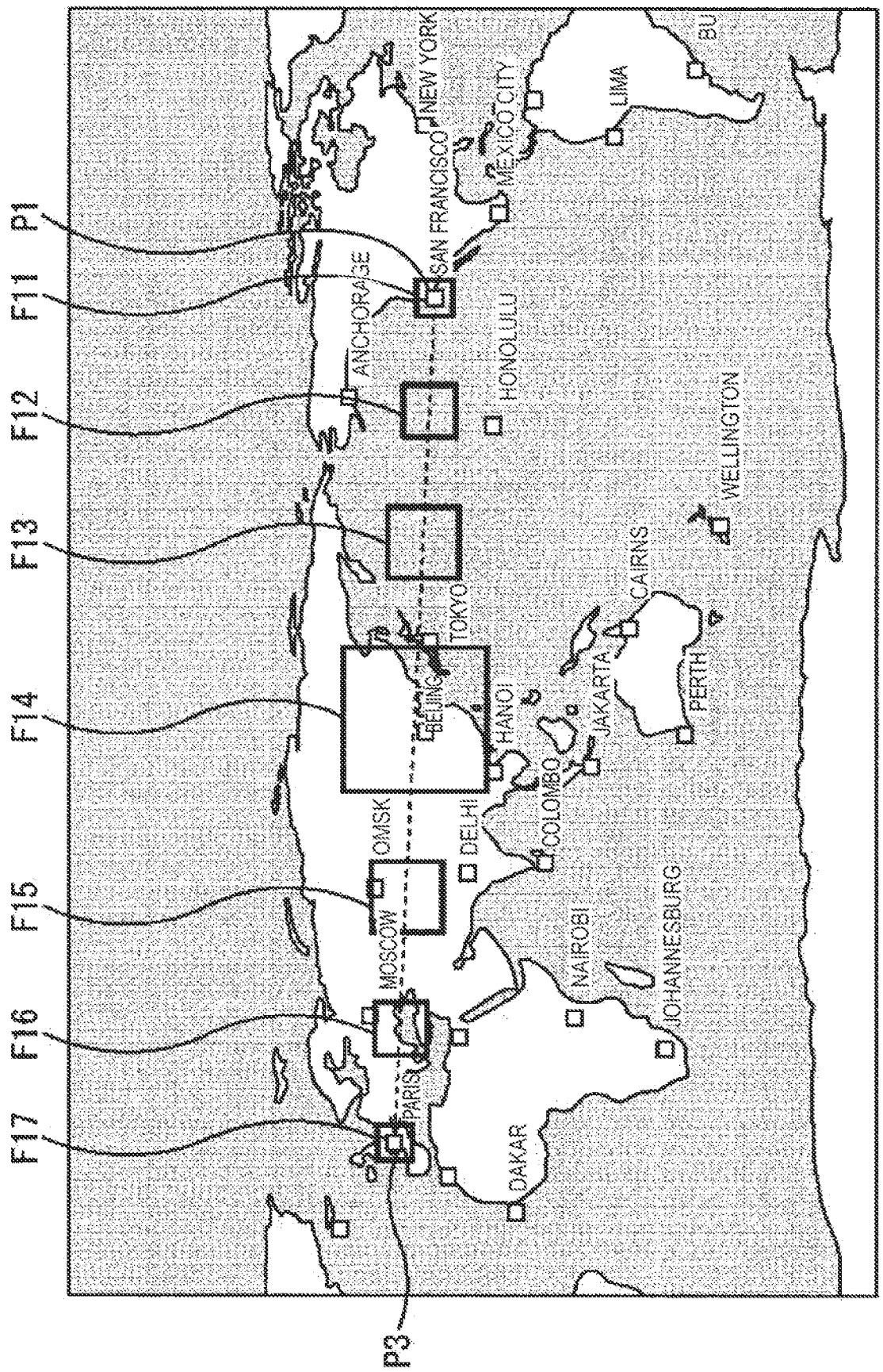
FIG. 16 is a diagram illustrating the change in the reduced scale of a planar map.

FIG. 15 and FIG. 16 are diagrams to describe the change in the reduced scale of the planar map.

Position P1 in FIG. 15 is the imaging position of the image 165 that is the previously selected image, and position P2 is the imaging position of the image 164 that is the newly selected image. The planar map displayed on the planar map area 11 is sequentially scrolled in the direction from positing P1 to position P2 along the line connecting position P1 and position P2.

Frames F1 to F5 are frames showing the display area of the planar map at each time of times t1 to t5. Frame F1 shows the display area of the planar map at time t1 immediately after the scrolling starts, where position P1 that is the imaging position of the image 165 is included in the vicinity of the center. Frame F2 shows the display area of the planar map at time t2 after the elapse of a predetermined time from time t1. Frame F3 shows the display area of the planar map at time t3 after the elapse of a predetermined time from time t2. Frame F4 shows the display area of the planar map at time t4 after the elapse of a predetermined time from time t3.

Frame F5 shows the display area of the planar map at time t5 after the elapse of a predetermined time from time t4, where position P2 that is the imaging position of the image 164 is included in the vicinity of the center.

As understood from the difference in the size of frames F1 to F5, the reduced scale of the planar map gradually becomes small until time t3 from time t1 immediately after the start of the scrolling, and, after that, the reduced scale of the planar map gradually becomes large until time t5.

With reference to FIG. 16, a case is described where the imaging position of the image 165 that is the previously selected image is position P1 and the imaging position of the image 164 that is a newly selected image is position P3. The distance of the scrolling of the planar map in the case of FIG. 16 is longer than the distance in the case of FIG. 15. The planar map is sequentially scrolled and displayed in the direction from position P1 toward position P3 along a line connecting position P1 and position P3.

Frames F11 to F17 are frames showing the display area of the planar map at each time of times t11 to t17. Frame F11 shows the display area of the planar map at time t11 where position P1 that is the imaging position of the image 165 is included in the vicinity of the center, and frame F17 shows the display area of the planar map at time t17 where position P3 that is the imaging position of the image 164 is included in the vicinity of the center.

Even in this example, the reduced scale of the planar map gradually becomes small until time t14 from time t11 immediately after the start of the scrolling, and, after that, the reduced scale of the planar map gradually becomes large until time t17. As understood from the comparison between frame F14 in FIG. 16 and frame F3 in FIG. 15 that show the display areas at the time when the reduced scale is the smallest, the minimum reduced scale becomes smaller as the travel distance becomes longer, and the planar map of a wider area is displayed on the planar map area 11 on the way of the scrolling.

Thus, by displaying the planar map that is zoomed out once and then zoomed in, the user can confirm a wider range map in the middle of the scrolling and understand the relationship between the imaging positions of images more easily.

Here, although the planar map is assumed to be scrolled along a straight line connecting two points, it may be scrolled along any line as long as the line connects the imaging position of the previously selected image and the imaging position of a newly selected image.

Returning to the explanation of FIG. 12, in a case where it is determined in step S43 that the cursor movement button is not pressed, processing in steps S44 to S47 is skipped. Moreover, in a case where it is determined in step S45 that the imaging position of the newly selected and the imaging position of the previously selected image are the same, the processing in steps S46 and S47 is skipped.

In step S48, the display control unit 122 determines whether the reproduction button is pressed.

In the case of determining that the reproduction button is pressed in step S48, the display control unit 122 reproduces the selection image in step S49.

In step S50, the display control unit 122 determines whether the slide show button is pressed.

In a case where it is determined in step S50 that the slide show button is pressed, the display control unit 122 performs slide show reproduction processing 2 in step S51. By slide show reproduction processing 2, a slide show for images taken in the positions of all pointers is performed. Slide show reproduction processing 2 is described later with reference to the flowchart in FIG. 18. In a case where it is determined in step S50 that the slide show button is not pressed, the processing in step S51 processing is skipped.

In step S52, the display control unit 122 determines whether the back button is pressed.

In a case where it is determining in step S52 that the back button is not pressed, the display control unit 122 returns to step S41 and repeats the above-mentioned processing. On the other hand, in a case where it is determining in step S52 that the back button is pressed, the display control unit 122 switches the operation mode to the position selection mode in step S40 in FIG. 11 and thereafter performs the processing in step S2 and subsequent steps in FIG. 1.

Figure 17:
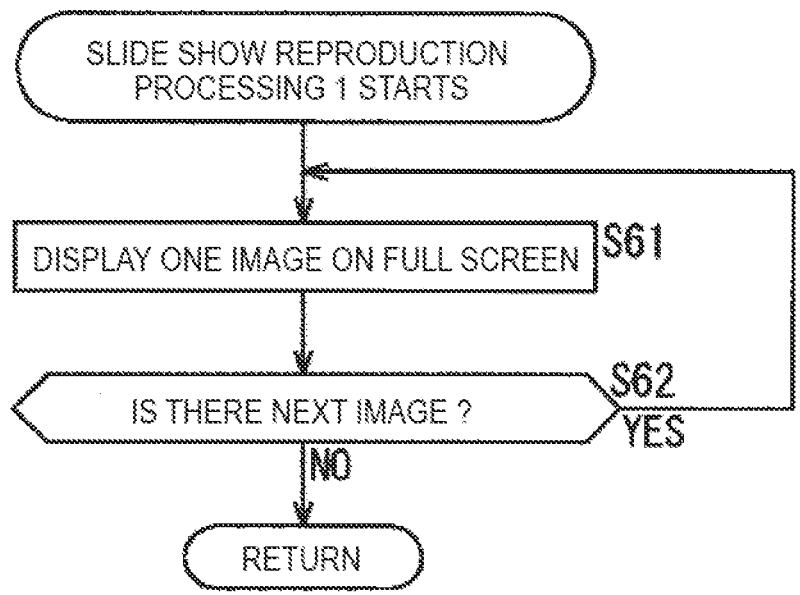
FIG. 17 is a flowchart illustrating slide show reproduction processing 1 performed in step S38 in FIG. 11.

Next, slide show reproduction processing 1 performed in step S38 in FIG. 11 is described with reference to the flowchart in FIG. 17. Slide show reproduction processing 1 is processing to perform a slide show for images forming a time series in a case where the time series of the images taken in the position of any pointer is displayed.

In step S61, the display control unit 122 selects one image from the images forming the time series, and expands and displays it on the full screen. For example, one image is sequentially selected from the images taken in the position of the currently selected pointer in order of imaging and displayed. The display of the identical image is continued only for a predetermined time.

In step S62, the display control unit 122 determines whether there is the next image, and, in the case of determining that there is the next image, returns to step S61 and keeps displaying the next image. On the other hand, in a case where it is determined in step S62 that all images taken in the position of the currently selected pointer are displayed and therefore there is no next image, it returns to step S38 in FIG. 17 and the subsequent processing is performed.

Next, slide show reproduction processing 2 performed in step S51 in FIG. 12 is described with reference to the flowchart in FIG. 18. Slide show reproduction processing 2 is processing to perform a slide show for images forming a time series in a case where the time series of the images taken in the positions of all pointers are displayed.

In step S71, the display control unit 122 selects one image from the images forming the time series, and expands and display it on the full screen.

In step S72, the display control unit 122 determines whether there is the next image, and, in the case of determining that there is the next image, determines in step S73 whether the imaging position of the image to be displayed next and the imaging position of the previously displayed image are different.

In a case where it is determined in step S73 that the imaging position of the image to be displayed next and the imaging position of the previously displayed image are different, in step S74, the display control unit 122 displays an animation showing that the imaging position of the image changes.

Figure 19:
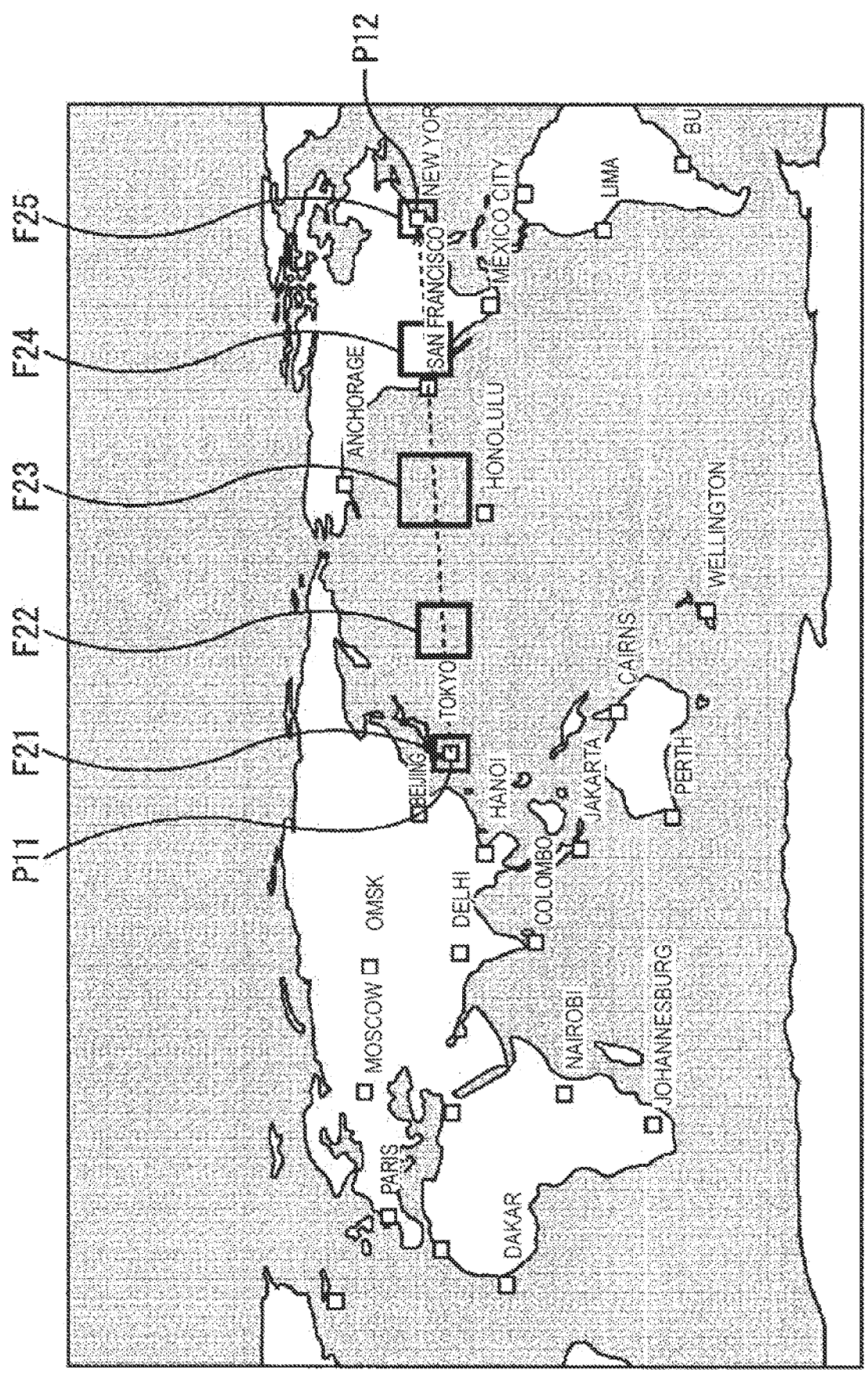
FIG. 19 is a diagram illustrating an animation.

FIG. 19 is a diagram illustrating an animation showing that the image imaging position changes. The animation displayed when the image imaging position changes is basically similar to the display at the time of the scrolling of the planar map described with reference to FIGS. 13 and 14.

Position P11 in FIG. 19 is the imaging position of the previously displayed image and position P12 is the imaging position of the image to be displayed next. A case is described where, after the last image of images taken in position P11 is displayed, images taken in position P12 are displayed next.

An animation displayed on the full screen on the display is formed with the map of each area on the line connecting position P11 and position P12, and the map of each area is sequentially displayed. As for the map of each area to be sequentially displayed, the reduced scale gradually becomes small until time t23 from time t21 immediately after the start of scrolling as shown in frames F21 to F25, and, after that, the reduced scale gradually becomes large until time t25.

Figure 21:
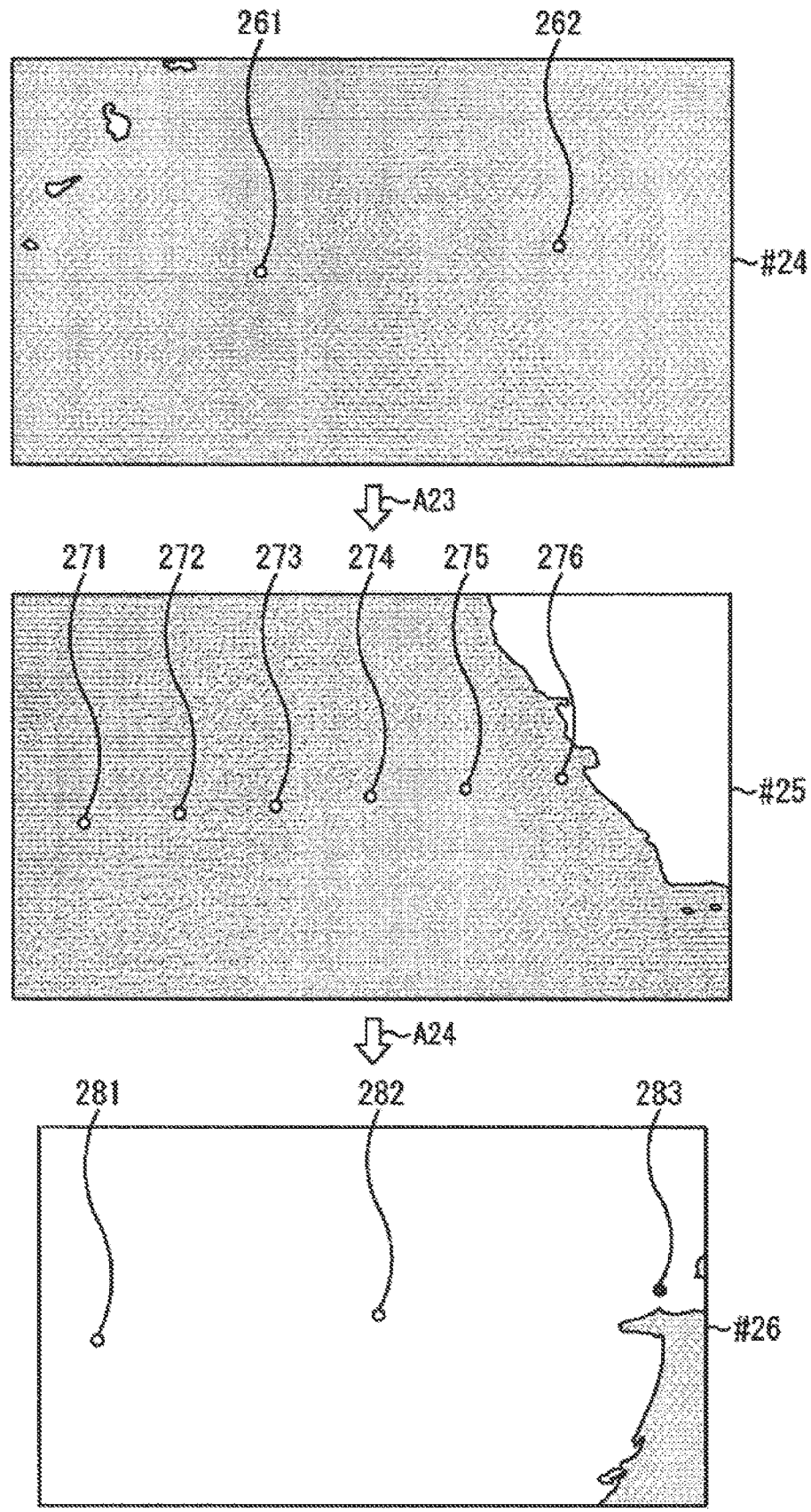
FIG. 21 is a diagram illustrating an animation example following FIG. 20.

FIGS. 20 to 22 are diagrams illustrating an example of an animation showing that the image imaging position changes.

Screen #21 in FIG. 20 is a screen before the animation starts, in which the last image of images taken in position P11 in FIG. 19 is displayed on the entire display.

After the last image taken in position P11 is displayed for only a predetermined time, the display on the display is switched to screen #22 indicated by the point of outlined arrow A21. Screen #22 is a screen to display the map of an area including position P11, and a pointer 251 indicating position P11 and a circle 252 enclosing and the pointer 251 are displayed on the map. The imaging date and time is displayed near the pointer 251.

Screen #23 indicated by the point of outlined arrow A22 is a screen immediately after the movement of the display area in the map is started toward the direction of position P12. In screen #23, the circle 252 becomes larger than the one at the time of display on screen #22, and a circular image 253 showing the trajectory of the movement of the display area is displayed in the direction of position P12.

Screens #23 to #26 in FIG. 21 are screens while the display area of the map is moved toward the direction of position P12. The trajectory of the movement of the display area is shown by images 261 and 262 of screen #23, images 271 to 276 of screen #24 and images 281 and 282 of screen #25. The interval of circles showing the trajectory of the movement of the display area changes according to the reduced scale of the map at that time. Pointer 283 of screen #25 shows position P12.

Screen #27 in FIG. 22 is a screen immediately after the movement of the display area of the map ends. A pointer 283 indicating the imaging position of the image to be displayed next is displayed in almost the center of screen #27. A circle 291 enclosing the pointer 283 and the imaging date and time of the image to be displayed next are displayed near the pointer 283.

Screen #28 indicated by the point of outlined arrow A25 is a screen in which the display of an animation ends and the first image of images taken in position P12 in FIG. 19 is displayed on the entire display. After screen #28 is displayed, a slide show of the images taken in position P12 is continued.

By displaying such an animation, the user can understand the relationship between the imaging positions of selected images.

Figure 18:
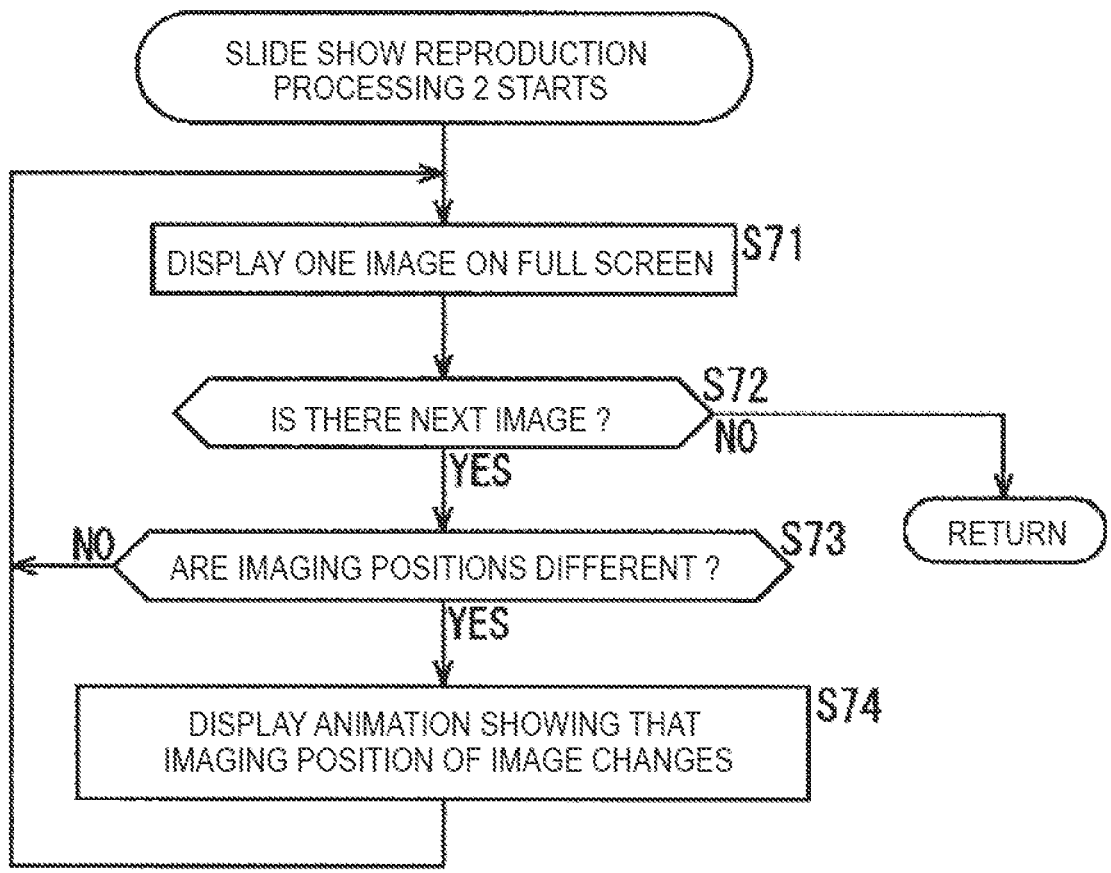
FIG. 18 is a flowchart illustrating slide show reproduction processing 2 performed in step S51 in FIG. 12.

Returning to the explanation of FIG. 18, after the animation display is performed in step S74, it returns to step S71 and the above-mentioned processing is repeated. Even in a case where it is determined in step S73 that the imaging position of the image to be displayed next and the imaging position of the previously displayed image are the same, it returns to step S71 in the same way and the above-mentioned processing is repeated.

Meanwhile, in a case where it is determined in step S72 that all images are displayed and there is no next image, it returns to step S51 in FIG. 18 and the subsequent processing is performed.

As described above, by switching the display of the planar map and the spherical map that is a wider area map according to selection of an image from the time series, it is possible to improve the user's convenience.

<Transformation Example>

Although the screen display as described above is performed by a device of a stationary type, it may be performed by various devices such as a portable terminal that imports an image file.

[Configuration Example of Computer]

The series of processing described above can be performed by hardware or software. In a case where the series of processing is performed by software, a program forming the software is installed in a computer incorporated in dedicated hardware or a general-purpose personal computer, and so on.

The installed program is recorded in the removable medium 111 in FIG. 7 and provided, where the removable medium 111 is formed with an optical disc (CD-ROM (Compact Disc-Read Only Memory), a DVD (Digital Versatile Disc) a semiconductor memory, or the like. Moreover, it may be provided through a wire or wireless transmission medium such as a local area network, the Internet and digital broadcast. The program can be installed in the ROM 102 or the storage unit 108 beforehand.

Here, a program executed by a computer may be a program to perform processing in chronological order along the order described in the present specification or a program to perform the processing in parallel or at a necessary timing at which calling is performed, and so on.

An embodiment of the present technology is not limited to the above-mentioned embodiment, and various changes can be made without departing from the scope of the present technology.

For example, the present technology can adopt a configuration of cloud computing that processes one function in a distributed and cooperative manner through a network.

Moreover, each step described in the above-mentioned flowcharts can be executed by one device or executed by multiple devices in a distributed manner.

Further, in a case where multiple items of processing are included in one step, the multiple items of processing included in one step may be performed by one device or performed by multiple devices in a distributed manner.

[Combination Example of Configuration]

Additionally, the present technology may also be configured as below.

(1)

An information processing device including:

an acquisition unit configured to acquire multiple images to which position information showing an imaging position is attached; and a display control unit configured to display a first map on which a pointer indicating the imaging position shown by the position information is displayed while switching a reduced scale and a display area according to an operation of a user, and configured to display a second map of a fixed reduced scale together with the first map while causing a display area to cooperate with a display area of the first map.

(2)

The information processing device according to (1), wherein the display control unit switches the display area of the first map so as to include the position indicated by the pointer selected by the user, and displays a representative image of the images taken in the position indicated by the selected pointer together with the first map and the second map.

(3)
The information processing device according to (2), wherein the display control unit displays a time series of the images taken in the position indicated by the selected pointer.
(4)
The information processing device according to (3), wherein the display control unit displays the images forming the time series one by one.
(5)
The information processing device according to (2), wherein the display control unit displays the time series of the images taken in positions of all pointers.
(6)
The information processing device according to (5), wherein the display control unit switches the display area of the first map so as to include an imaging position of one image selected from the time series.
(7)
The information processing device according to (6), wherein, when the imaging position of the newly selected image and the imaging position of the previously selected image are different, the display control unit scrolls the display area of the first map from an area including the imaging position of the previously selected image to an area including the imaging position of the newly selected image.
(8)
The information processing device according to (7), wherein, when scrolling the display area of the first map, the display control unit displays the first map of each area while changing the reduced scale according to a distance between the imaging position of the newly selected image and the imaging position of the previously selected image.
(9)
The information processing device according to (8), wherein the display control unit displays the first map of each area while decreasing a minimum reduced scale as the distance between the imaging position of the newly selected image and the imaging position of the previously selected image is longer.
(10)
The information processing device according to any one of (5) to (9), wherein the display control unit erases the display of the first map and the second map, and displays the images forming the time series one by one.
(11)
The information processing device according to (10), wherein, when the imaging position of the newly displayed image and the imaging position of the previously displayed image are different, the display control unit displays an animation formed with a map of each area on a line connecting the imaging position of the previously displayed image and the imaging position of the newly displayed image, before displaying the newly displayed image.
(12)
The information processing device according to (11), wherein the display control unit displays the map of each area forming the animation while changing the reduced scale according to the distance between the imaging position of the newly displayed image and the imaging position of the previously displayed image.
(13)
The information processing device according to (12), wherein the display control unit displays the map of each area while decreasing a minimum reduced scale as the distance between the imaging position of the newly displayed image and the imaging position of the previously displayed image is longer.
(14)
The information processing device according to any one of (11) to (13), wherein the display control unit displays images showing a trajectory on the line connecting the imaging position of the newly displayed image and the imaging position of the previously displayed image.
(15)
The information processing device according to any one of (1) to (14), wherein the second map is a map shown by orthographic projection.
(16)
An information processing method including:
acquiring multiple images to which position information showing an imaging position is attached; and
displaying a first map on which a pointer indicating the imaging position shown by the position information is displayed while switching a reduced scale and a display area according to an operation of a user, and displaying a second map of a fixed reduced scale together with the first map while causing a display area to cooperate with a display area of the first map.
(17)
A program for causing a computer to execute:
acquiring multiple images to which position information showing an imaging position is attached; and
displaying a first map on which a pointer indicating the imaging position shown by the position information is displayed while switching a reduced scale and a display area according to an operation of a user, and displaying a second map of a fixed reduced scale together with the first map while causing a display area to cooperate with a display area of the first map.

REFERENCE SIGNS LIST

1 information processing device
2 controllers
3 cable
4 display device
121 image acquisition unit
122 display control unit

The invention claimed is:
1. An information processing apparatus, comprising:
circuitry configured to
acquire a plurality of images in which position information showing an imaging position is attached;
control display of a first map image, a positional information, and the plurality of images on a first screen image, wherein the positional information indicates the position of a currently selected pointer from among a plurality of pointers displayed on the first map image, corresponds to two or more images of the plurality of images, and is displayed in a part of the first screen image that is outside the first map image, wherein the first map image, the positional information and the plurality of images are displayed simultaneously on the first screen image;
acquire a user input of selecting an image;
control display of the image selected by the user input and a second map image related to the selected image on a second screen image, wherein the second screen image includes second positional information and a second plurality of images, the image selected by the user being one of the second plurality of images, and wherein the second positional information indicates the imaging position of the image selected by the user and is displayed in a part of the second screen image that is outside the second map image, wherein the second map image, the second positional information and the second plurality of images are displayed simultaneously on the second screen image; and control switching between display of the first screen image and display of the second screen image, wherein the circuitry is configured to control display of an indication of availability of a back function on the second screen image, and wherein activation of the back function causes the information processing apparatus to switch from an image selection mode to a position selection mode.

2. The information processing apparatus according to claim 1, wherein at least one image of the second plurality of images other than the image selected by the user input is included in the plurality of images.

3. The information processing apparatus according to claim 1, wherein the center of the second map image corresponds to the imaging position of the image selected by the user input.

4. The information processing apparatus according to claim 1, wherein the second map image includes a pointer indicating the imaging position of the image selected by the user input.

5. The information processing apparatus according to claim 1, wherein the first map image and the second map image are planar map images.

\* \* \* \* \*